United States Patent [19]

Nonaka et al.

[11] Patent Number: 5,703,579
[45] Date of Patent: Dec. 30, 1997

[54] DECODER FOR COMPRESSED DIGITAL SIGNALS

[75] Inventors: Tsutomu Nonaka; Toshiyuki Naoe; Hirofumi Sato; Toshihiko Nishimura; Naohisa Suzuki, all of Tokyo, Japan

[73] Assignee: Nippon Steel Corporation, Tokyo, Japan

[21] Appl. No.: 638,230

[22] Filed: Apr. 26, 1996

[30] Foreign Application Priority Data

| May 2, 1995 | [JP] | Japan | 7-132907 |
| May 23, 1995 | [JP] | Japan | 7-148299 |
| Jun. 13, 1995 | [JP] | Japan | 7-170341 |
| Jun. 20, 1995 | [JP] | Japan | 7-176629 |

[51] Int. Cl.[6] ............................ H03M 7/00
[52] U.S. Cl. ............................ 341/50; 341/67; 348/398
[58] Field of Search .............. 341/50, 106, 67; 348/423, 403, 398

[56] References Cited

U.S. PATENT DOCUMENTS

| 5,511,094 | 4/1996 | Lee et al. | 375/243 |
| 5,588,029 | 12/1996 | Maturi et al. | 375/364 |

Primary Examiner—Jeffrey A. Gaffin
Assistant Examiner—Peguy JeanPierre
Attorney, Agent, or Firm—Pollock, Vande Sande & Priddy

[57] ABSTRACT

In an encoder for decoding compression data obtained by conducting a compression encoding for digital data through subband division, logarithmic compression, and variable-bit-length quantization, an exponent of an exponent operation is separated into an integer part and a fraction part to obtain an operation formula such that an operation related to the fraction part is executed through a multiplication and an operation associated with the integer part is accomplished through a shift operation. In addition, using a correlation between results of the calculations, the number of calculation steps is reduced. Moreover, one type of information data is written in an area in which another type of information data is beforehand written so as to minimize the necessary memory capacity.

35 Claims, 25 Drawing Sheets

FIG. 3

| ALLOCATION CODE | No. OF VALUES AVAILABLE FOR SAMPLE | BIT WIDTH OF SAMPLE | |
|---|---|---|---|
| 00000 | 0 | 0 | Alloc=C |
| 10010 | 3 | 2 (5) | grouping |
| 10011 | 5 | 3 (7) | grouping |
| 00011 | 7 | 3 | |
| 10100 | 9 | 4 (10) | grouping |
| 00100 | 15 | 4 | |
| 00101 | 31 | 5 | |
| 00110 | 63 | 6 | |
| 00111 | 127 | 7 | |
| 01000 | 255 | 8 | |
| 01001 | 511 | 9 | |
| 01010 | 1023 | 10 | |
| 01011 | 2047 | 11 | |
| 01100 | 4095 | 12 | |
| 01101 | 8191 | 13 | |
| 01110 | 16383 | 14 | |
| 01111 | 32767 | 15 | |
| 00001 | 65535 | 16 | |

— BIT WIDTH OF SAMPLE

1 : SAMPLE CODE
0 : SAMPLE

FIG. 4

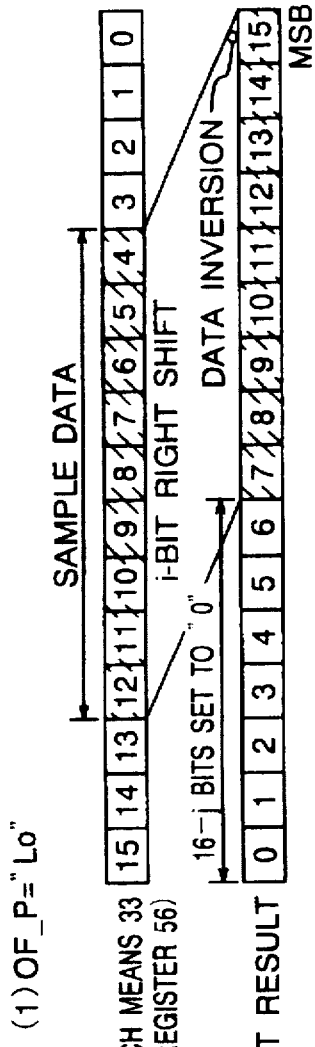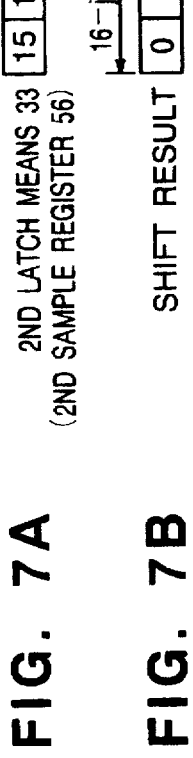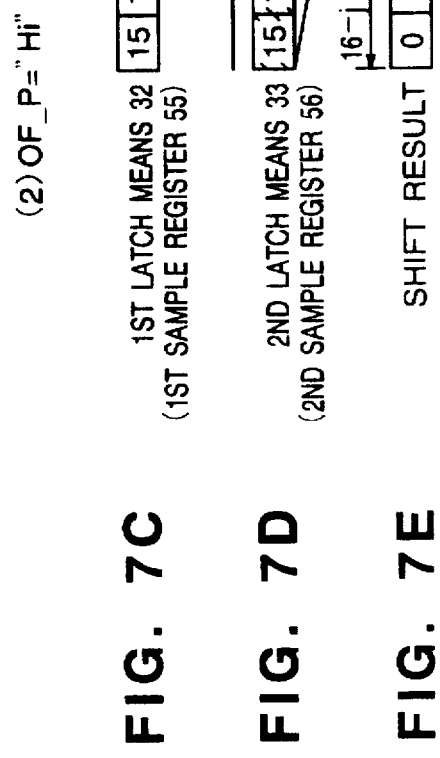

| ch \ GR | 0 | 1 | 2 |
|---|---|---|---|
| 0 | 0 | al0 | al0×2 |
| 1 | al0×3 | al×3 +al1 | al×3 +al×2 |

NOTE: al0 : BIT WIDTH OF SAMPLE ON CHANNEL 0 OF CORRESPONDING SUBBAND
al1 : BIT WIDTH OF SAMPLE ON CHANNEL 1 OF CORRESPONDING SUBBAND

FIG. 12A PRIOR ART
PROCESS ACCORDING TO STANDARDS
(FACTOR AND COEFFICIENTS C AND D GATHERED IN ROM)

3 CYCLES

| PROCESS STEP / FUNCTION BLOCK | CYCLE 1 | CYCLE 2 | CYCLE 3 | CYCLE 4 |
|---|---|---|---|---|
| SAMPLE MEMORY BLOCK | READ S" | | | READ NEXT S" |
| COEFFICIENT (FACTOR,C,D) ROM | READ D | READ C | READ FACTOR | READ NEXT D |
| ADDER | | S"+D | | |
| MULTIPLIER | | | C(S"+D) | FACTOR{C'(S"+D)} |

FIG. 12B PRIOR ART
PROCESS ACCORDING TO STANDARDS
(COEFFICIENT ROM SUBDIVIDED INTO TWO PARTITIONS)

2 CYCLES

| PROCESS STEP / FUNCTION BLOCK | CYCLE 1 | CYCLE 2 | CYCLE 3 | CYCLE 4 |
|---|---|---|---|---|
| SAMPLE MEMORY BLOCK | READ S" | | READ NEXT S" | |
| COEFFICIENT ROM1(D) | READ D | | READ NEXT D | |
| COEFFICIENT ROM2(FACTOR,C) | | READ C | READ FACTOR | |
| ADDER | | S"+D | | |
| MULTIPLIER | | | C(S"+D) | FACTOR{C'(S"+D)} |

FIG. 12C
PROCESS ACCORDING TO EMBODIMENT

1 CYCLE

| PROCESS STEP / FUNCTION BLOCK | CYCLE 1 | CYCLE 2 | CYCLE 3 | CYCLE 4 |
|---|---|---|---|---|
| SAMPLE MEMORY BLOCK | READ S" (PROCESS S"+D IN READ OPERATION) | | READ NEXT S" | |
| COEFFICIENT (C') ROM | READ C' | | READ NEXT C' | |
| MULTIPLIER | | C'(S"+D) | | C'(S"+D) |
| SHIFTER | | $2^{-m}\{C'(S"+D)\}$ | | $2^{-m}\{C'(S"+D)\}$ |

FIG. 14
PRIOR ART

| | | | |
|---|---|---|---|
| $V_0$ | $V_{16}$ | $V_{32} = -V_0$ | $V_{48}$ |
| $V_1$ | $V_{17} = -V_{15}$ | $V_{33}$ | $V_{49} = -V_{47}$ |
| $V_2$ | $V_{18} = -V_{14}$ | $V_{34}$ | $V_{50} = -V_{46}$ |
| $V_3$ | $V_{19} = -V_{13}$ | $V_{35}$ | $V_{51} = -V_{45}$ |
| $V_4$ | $V_{20} = -V_{12}$ | $V_{36}$ | $V_{52} = -V_{44}$ |
| $V_5$ | $V_{21} = -V_{11}$ | $V_{37}$ | $V_{53} = -V_{43}$ |
| $V_6$ | $V_{22} = -V_{10}$ | $V_{38}$ | $V_{54} = -V_{42}$ |
| $V_7$ | $V_{23} = -V_9$ | $V_{39}$ | $V_{55} = -V_{41}$ |
| $V_8$ | $V_{24} = -V_8$ | $V_{40}$ | $V_{56} = -V_{40}$ |
| $V_9$ | $V_{25} = -V_7$ | $V_{41}$ | $V_{57} = -V_{39}$ |
| $V_{10}$ | $V_{26} = -V_6$ | $V_{42}$ | $V_{58} = -V_{38}$ |
| $V_{11}$ | $V_{27} = -V_5$ | $V_{43}$ | $V_{59} = -V_{37}$ |
| $V_{12}$ | $V_{28} = -V_4$ | $V_{44}$ | $V_{60} = -V_{36}$ |
| $V_{13}$ | $V_{29} = -V_3$ | $V_{45}$ | $V_{61} = -V_{35}$ |
| $V_{14}$ | $V_{30} = -V_2$ | $V_{46}$ | $V_{62} = -V_{34}$ |
| $V_{15}$ | $V_{31} = -V_1$ | $V_{47}$ | $V_{63} = -V_{33}$ |

NOTE: $V_{16} = 0$

FIG. 15

| | |
|---|---|
| $V'_0 = V_0$ | $V'_{16} = V_{33}$ |
| $V'_1 = V_1$ | $V'_{17} = V_{34}$ |
| $V'_2 = V_2$ | $V'_{18} = V_{35}$ |
| $V'_3 = V_3$ | $V'_{19} = V_{36}$ |
| $V'_4 = V_4$ | $V'_{20} = V_{37}$ |
| $V'_5 = V_5$ | $V'_{21} = V_{38}$ |
| $V'_6 = V_6$ | $V'_{22} = V_{39}$ |
| $V'_7 = V_7$ | $V'_{23} = V_{40}$ |
| $V'_8 = V_8$ | $V'_{24} = V_{41}$ |
| $V'_9 = V_9$ | $V'_{25} = V_{42}$ |
| $V'_{10} = V_{10}$ | $V'_{26} = V_{43}$ |
| $V'_{11} = V_{11}$ | $V'_{27} = V_{44}$ |
| $V'_{12} = V_{12}$ | $V'_{28} = V_{45}$ |
| $V'_{13} = V_{13}$ | $V'_{29} = V_{46}$ |
| $V'_{14} = V_{14}$ | $V'_{30} = V_{47}$ |
| $V'_{15} = V_{15}$ | $V'_{31} = V_{48}$ |

FIG. 22
PRIOR ART

| HEADER INFORMATION | CRC INFORMATION | ALLOCATION INFORMATION | scfsi INFORMATION | SCALE FACTOR INFORMATION | SAMPLE INFORMATION OR SAMPLE CODE INFORMATION |

FIG. 23
PRIOR ART

| sb | nbal | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | 4 | – | 3 | 7 | 15 | 31 | 63 | 127 | 255 | 511 | 1023 | 2047 | 4095 | 8191 | 16383 | 32767 | 65535 |
| 1 | 4 | – | 3 | 7 | 15 | 31 | 63 | 127 | 255 | 511 | 1023 | 2047 | 4095 | 8191 | 16383 | 32767 | 65535 |
| 2 | 4 | – | 3 | 7 | 15 | 31 | 63 | 127 | 255 | 511 | 1023 | 2047 | 4095 | 8191 | 16383 | 32767 | 65535 |
| 3 | 4 | – | 3 | 5 | 7 | 9 | 15 | 31 | 63 | 127 | 255 | 511 | 1023 | 2047 | 4095 | 8191 | 65535 |
| 4 | 4 | – | 3 | 5 | 7 | 9 | 15 | 31 | 63 | 127 | 255 | 511 | 1023 | 2047 | 4095 | 8191 | 65535 |
| 5 | 4 | – | 3 | 5 | 7 | 9 | 15 | 31 | 63 | 127 | 255 | 511 | 1023 | 2047 | 4095 | 8191 | 65535 |
| 6 | 4 | – | 3 | 5 | 7 | 9 | 15 | 31 | 63 | 127 | 255 | 511 | 1023 | 2047 | 4095 | 8191 | 65535 |
| 7 | 4 | – | 3 | 5 | 7 | 9 | 15 | 31 | 63 | 127 | 255 | 511 | 1023 | 2047 | 4095 | 8191 | 65535 |
| 8 | 4 | – | 3 | 5 | 7 | 9 | 15 | 31 | 63 | 127 | 255 | 511 | 1023 | 2047 | 4095 | 8191 | 65535 |
| 9 | 3 | – | 3 | 5 | 7 | 9 | 15 | 31 | 63 | 127 | 255 | 511 | 1023 | 2047 | 4095 | 8191 | 65535 |
| 10 | 3 | – | 3 | 5 | 7 | 9 | 15 | 31 | 63 | 127 | 255 | 511 | 1023 | 2047 | 4095 | 8191 | 65535 |
| 11 | 3 | – | 3 | 5 | 7 | 9 | 15 | 31 | 63 | 127 | 255 | 511 | 1023 | 2047 | 4095 | 8191 | 65535 |
| 12 | 3 | – | 3 | 5 | 7 | 9 | 15 | 31 | 63 | 127 | 255 | 511 | 1023 | 2047 | 4095 | 8191 | 65535 |
| 13 | 3 | – | 3 | 5 | 7 | 9 | 15 | 31 | 63 | 127 | 255 | 511 | 1023 | 2047 | 4095 | 8191 | 65535 |
| 14 | 3 | – | 3 | 5 | 7 | 9 | 15 | 31 | 63 | 127 | 255 | 511 | 1023 | 2047 | 4095 | 8191 | 65535 |
| 15 | 3 | – | 3 | 5 | 7 | 9 | 15 | 31 | 63 | 127 | 255 | 511 | 1023 | 2047 | 4095 | 8191 | 65535 |
| 16 | 3 | – | 3 | 5 | 7 | 9 | 15 | 31 | 63 | 127 | 255 | 511 | 1023 | 2047 | 4095 | 8191 | 65535 |
| 17 | 3 | – | 3 | 5 | 7 | 9 | 15 | 31 | 63 | 127 | 255 | 511 | 1023 | 2047 | 4095 | 8191 | 65535 |
| 18 | 3 | – | 3 | 5 | 7 | 9 | 15 | 31 | 63 | 127 | 255 | 511 | 1023 | 2047 | 4095 | 8191 | 65535 |
| 19 | 3 | – | 3 | 5 | 7 | 9 | 15 | 31 | 63 | 127 | 255 | 511 | 1023 | 2047 | 4095 | 8191 | 65535 |
| 20 | 3 | – | 3 | 5 | 7 | 9 | 15 | 31 | 65535 | | | | | | | |
| 21 | 3 | – | 3 | 5 | 7 | 9 | 15 | 31 | 65535 | | | | | | | |
| 22 | 3 | – | 3 | 5 | 7 | 9 | 15 | 31 | 65535 | | | | | | | |
| 23 | 2 | – | 3 | 5 | 7 | 9 | 15 | 31 | 65535 | | | | | | | |
| 24 | 2 | – | 3 | 5 | 7 | 9 | 15 | 31 | 65535 | | | | | | | |
| 25 | 2 | – | 3 | 5 | 7 | 9 | 15 | 31 | 65535 | | | | | | | |
| 26 | 2 | – | 3 | 5 | 7 | 65535 | | | | | | | | | | |
| 27 | 2 | – | 3 | 5 | 7 | 65535 | | | | | | | | | | |
| 28 | 2 | – | 3 | 5 | 7 | 65535 | | | | | | | | | | |
| 29 | 2 | – | 3 | 5 | 7 | 65535 | | | | | | | | | | |
| 30 | 0 | – | 3 | 5 | 7 | 65535 | | | | | | | | | | |
| 31 | 0 | – | 3 | 5 | 65535 | | | | | | | | | | | |

INDEX

FIG. 24
PRIOR ART

| scfci | No. OF SCALE FACTORS | | SCALE FACTOR 0 | SCALE FACTOR 1 | SCALE FACTOR 2 |
|---|---|---|---|---|---|
| 0 : 0 | 3 | a, b, c | a | b | c |
| 0 : 1 | 2 | a, b | a | a | b |
| 1 : 0 | 1 | a | a | a | a |
| 1 : 1 | 2 | a, b | a | b | b |

FIG. 25
PRIOR ART

| INDEX | FACTOR | INDEX | FACTOR |
|---|---|---|---|
| 0 | 2,00000000000000 | 32 | 0,00123039165029 |
| 1 | 1,58740105196820 | 33 | 0,00097656250000 |
| 2 | 1,25992104989487 | 34 | 0,00077509816991 |
| 3 | 1,00000000000000 | 35 | 0,00061519582514 |
| 4 | 0,79370052598410 | 36 | 0,00048828125000 |
| 5 | 0,62996052494744 | 37 | 0,00038754908495 |
| 6 | 0,50000000000000 | 38 | 0,00030759791257 |
| 7 | 0,39685026299205 | 39 | 0,00024414062500 |
| 8 | 0,31498026247372 | 40 | 0,00019377454248 |
| 9 | 0,25000000000000 | 41 | 0,00015379895629 |
| 10 | 0,19842513149602 | 42 | 0,00012207031250 |
| 11 | 0,15749013123686 | 43 | 0,00009688727124 |
| 12 | 0,12500000000000 | 44 | 0,00007689947814 |
| 13 | 0,09921256574801 | 45 | 0,00006103515625 |
| 14 | 0,07874506561843 | 46 | 0,00004844363562 |
| 15 | 0,06250000000000 | 47 | 0,00003844973907 |
| 16 | 0,04960628287401 | 48 | 0,00003051757813 |
| 17 | 0,03937253280921 | 49 | 0,00002422181781 |
| 18 | 0,03125000000000 | 50 | 0,00001922486954 |
| 19 | 0,02480314143700 | 51 | 0,00001525878906 |
| 20 | 0,01968626640461 | 52 | 0,00001211090890 |
| 21 | 0,01562500000000 | 53 | 0,00000961243477 |
| 22 | 0,01240157071850 | 54 | 0,00000762939453 |
| 23 | 0,00984313320230 | 55 | 0,00000605545445 |
| 24 | 0,00781250000000 | 56 | 0,00000480621738 |
| 25 | 0,00620078535925 | 57 | 0,00000381469727 |
| 26 | 0,00492156660115 | 58 | 0,00000302772723 |
| 27 | 0,00390625000000 | 59 | 0,00000240310869 |
| 28 | 0,00310039267963 | 60 | 0,00000190734863 |
| 29 | 0,00246078330058 | 61 | 0,00000151386361 |
| 30 | 0,00195312500000 | 62 | 0,00000120155435 |
| 31 | 0,00155019633981 | | |

FIG. 26
PRIOR ART

| | C | D | | | |
|---|---|---|---|---|---|
| 3 | 1.333333333333 | 0.500000000000 | yes | 3 | 5 (2) |
| 5 | 1.600000000000 | 0.500000000000 | yes | 3 | 7 (3) |
| 7 | 1.142857142857 | 0.250000000000 | no | 1 | 3 |
| 9 | 1.777777777777 | 0.500000000000 | yes | 3 | 10 (4) |
| 15 | 1.066666666666 | 0.125000000000 | no | 1 | 4 |
| 31 | 1.032258064452 | 0.062500000000 | no | 1 | 5 |
| 63 | 1.015873015873 | 0.031250000000 | no | 1 | 6 |
| 127 | 1.007874015575 | 0.015625000000 | no | 1 | 7 |
| 255 | 1.003921568863 | 0.007812500000 | no | 1 | 8 |
| 511 | 1.001956694716 | 0.003906250000 | no | 1 | 9 |
| 1023 | 1.000977751711 | 0.001953125000 | no | 1 | 10 |
| 2047 | 1.000488519792 | 0.000976562500 | no | 1 | 11 |
| 4095 | 1.000244220024 | 0.000488281250 | no | 1 | 12 |
| 8191 | 1.000122088522 | 0.000244140063 | no | 1 | 13 |
| 16383 | 1.000061038888 | 0.000122070313 | no | 1 | 14 |
| 32767 | 1.000030518513 | 0.000061035156 | no | 1 | 15 |
| 65535 | 1.000015259020 | 0.000030517580 | no | 1 | 16 |

DECODER FOR COMPRESSED DIGITAL SIGNALS

FIELD OF THE INVENTION

The present invention relates to a decoder for decoding a digital signal compressed by a data compressing technology (a high efficiency encoding technology), and in particular, to a decoder suitable for decoding audio data compressed by a data compressing technology called "moving picture experts group (MPEG)".

In the data compressing technology, to minimize the amount of data, it has been a common practice to employ a variable bit width, i.e., a variable bit length. Additionally, characteristic processes such as subband division and logarithmic compression processes are carried out depending on cases. Operation of a decoder to execute these processes and to decode compressed data will be next described according to an example of a process of digital audio signals in association with MPEG.

MPEG is a data compression technology recently developed to record and/or to transmit high-density moving picture and audio signals. At the present stage of art, a standard called MPEG 1 has been stipulated for the audio signal process according to MPEG. In the MPEG1 standard, three process ways including layer I, layer II, and layer III having been supported in relation to the required sound quality and circuit size.

Moreover, for the MPEG audio, there are stipulated various channel modes of audio signals such as the single channel, dual channel, stereo, and joint stereo modes. Additionally, for the MPEG audio, there are stipulated various items including the transmission rates (bit rates) available for the respective channel modes of each layer and the output rates (sampling frequencies) of reproduced audio signals.

For example, audio data is subdivided into 32 subbands in the stereo mode such that sample data is encoded for each subband and each subband includes two channels. Audio compressed data thus encoded primarily includes allocation, scale factor, and sample data.

Furthermore, when decoding the audio compressed data, the sample data is processed according to the allocation and scale factor so as to produce PCM data.

In short, an inverse quantization process and an inverse scaling process are first conducted using the allocation, scale factor, and sample data to attain subband sample data for each subband. Utilizing next the subband sample data, a complex subband filtering process is accomplished to create PCM data.

For example, in the stereo mode, audio data is subdivided into 32 subbands in layer I and up to 30 subbands in layer II. Each subband includes two channels.

FIG. 22 shows a bit stream of audio data compressed according to MPEG1 layer II. As can be seen from FIG. 22, one frame of audio compressed data includes a header, a cyclic redundancy check (CRC) code, allocation, scale factor selection information (scfsi), a scale factor, and a sample or a sample code (which will be collectively called sample data). These items are inputted to an MPEG audio decoder in this sequence.

In the data, the header includes a bit rate, a sampling frequency, and/or basic information items such as a channel mode indicating a stereo or monaural channel. In addition, the CRC code is used to decide whether or not the bit stream includes an error.

Furthermore, the allocation, the scale factor and sample data are information items which constitute the audio compression data itself. By processing the sample data according to the allocation and scale factor, the audio compressed data is decoded to generate PCM data.

In short, the allocation includes information employed in the operation of inverse quantization where each sample data is reproduced by attaining a bit width thereof in the decoding operation. The allocation includes information indicating the number of bits of sample data to be subsequently inputted and information indicating whether the sample data is a sample or a sample code. These information items can be recognized by reference to a table shown in FIG. 23 according to the value of allocation and subband number in conformity with ISO/IEC 11172 MPEG1 audio layer II standard.

In FIG. 23, the item denoted as "nbal" indicates the bit width of allocation. When the allocation is four-bit wide (sbbands sb0 to sb10), the allocation takes 16 values ranging from 0 to 15. Additionally, when the allocation is three-bit wide (subbands sb11 to sb22), the allocation takes eight values ranging from 0 to 7. Furthermore, when the allocation is two-bit wide (subbands sb23 to sb29), the allocation takes four values ranging from 0 to 3.

In the layer II standard, it is not allowed that all bits of sample data take the value of "1". Therefore, when the subband number sb is two and the allocation value is five, the sample data takes 63 values and the number of bits thereof is six. Furthermore, when the subband number sb is 20 and the allocation value is five, the sample data takes 15 values and the number of bits thereof is four.

In addition, when the sample data takes three, five, and nine values, the sample data is inputted in the form of a sample code. Consequently, deciding the number of values available for the sample data by referring to FIG. 23, it is possible to determine whether the sample data is a sample or a sample code.

Incidentally, the sample code includes three samples successively existing along the time axis for each subband. For example, when one sample can take three values (two bits), six bits are used for three samples in the ordinary case. However, when the contents thereof are collected into one code, there are required only five bits for the following reasons. Assume that sample data items are represented as A, B, and C. The value of sample code X is expressed as follows.

$$X = 3^2 A + 3B + C$$

Since the maximum value of A, B, and C is two, the maximum value of X is 26 and hence can be represented by five bits. Moreover, when one sample can take five values (three bits) or nine values (four bits), three samples ordinarily require nine or 12 bits, respectively. However, when the contents thereof are gathered, there are required only seven or ten bits, respectively.

Additionally, the scale factor is information employed in the inverse scaling operation where the logarithmically compressed data after the inverse quantization is expanded and it represents the value of a scaling factor to roughly obtain the output level. In this regard, in the case of layer II, when counted in the frame unit, there exists 36 samples for each channel of each subband along the time axis direction. In these 36 samples, a different scale factor value can be taken for each group of 12 successive samples.

Namely, assume the scale factors respectively of samples 0 to 11, 12 to 23, and 24 to 35 along the time axis direction to be represented as scale factors 0 to 2, respectively. As can be seen from FIG. 24, each of scale factors 0 to 2 is assigned with either one of the scale factors a to c.

Moreover, scfsi is a parameter designating the number (one to three) of scale factors existing for each channel of each subband and is used only in layer II. That is, scfsi indicates an associated one of four patterns shown in FIG. 24.

Audio compression data, including the bit stream above, is decoded as follows. Namely, the inverse quantization and inverse scaling processes are first effected to obtain subband sample data. Subsequently, the complex subband filtering process is conducted to combine the subband sample data to generate PCM data.

In general, the conventional MPEG audio decoder includes several buffer memories to store therein the bit stream of FIG. 22 and data attained through a sequence of processes described above. For example, there are used a buffer memory to temporarily store therein information items of the bit stream and a buffer memory called a V vector RAM (random access memory) for provisionally storing therein information called V vector obtained from the subband sample data in the course of the complex subband filtering process.

The subband sample data is rendered according to the following expression.

$$S = \text{factor} \times C \times (S'' + D) \tag{1}$$

In expression (1), "factor" is a value of operation identified according to the value of the scale factor. Assuming the scale factor value to be represented as "index", "factor" is expressed as follows.

$$\text{factor} = 2^{1-\text{index}/3} \tag{2}$$

FIG. 25 shows a relationship between the scale factor values (indices) and factor values. The exponential operation is done to expand data logarithmically compressed in the encoding stage.

Additionally, the value S" of expression (1) is attained by inverting the most-significant bit (MSB) of the sample. Similarly, the values C and D of expression (1) are predetermined coefficients for the inverse quantization and take values as listed in FIG. 26. As can be seen from FIG. 26, the coefficients C and D take different values depending on the number of values available for the sample. That is, in accordance with the allocation value, appropriate coefficients are selected from FIG. 26.

In the operation to obtain the subband sample data represented by expression (1), an inverse quantization is first carried out as C×(S"+D) and then an inverse scaling operation is effected to multiply the factor value by the result of the preceding operation. In this connection, the factor value and values of coefficients C and D are beforehand stored in tables as shown in FIGS. 25 and 26.

Incidentally, to execute the complex subband filtering process to obtain PCM data from the subband sample data thus attained, quite a large number of operations are required when the audio data is concurrently processed for 32 subbands thereof. In this situation, to solve the problem, there is employed a technology called poly-phase filter bank depending on cases. According to the bank technology, the process is designed to quite effectively achieve calculations such that a dexterous mathematical scheme is used to process 32 bands at a time to cancel aliasing.

However, when 32 PCM data items are produced at a time by use of the poly-phase filter bank, the generated PCM data items are continuously outputted and hence there is required a memory for PCM data in the output stage of the decoder. Provision of the memory leads to a problem of the large memory capacity.

To overcome this problem, there has been proposed a complex subband filtering process capable of making the output memory unnecessary.

FIG. 27 is a flowchart showing the contents of the subband filtering process in layers I and II. In FIG. 27, 32 subband sample data items S attained for the respective subbands are inputted to an internal memory, not shown, in step P21.

Thereafter, the address of the V vector RAM is shifted by 64 words in step P22. As a result, the areas related to addresses ranging from address 0 to address 63 are set to an empty state as shown in FIG. 28, thereby reserving a storage area for the V vectors to be calculated.

Subsequently, in step P23, 64 V vectors are calculated from 32 subband sample data items S inputted in step P21. In this regard, these V vectors are attained in accordance with expression (3). The resultant V vectors are provisionally stored in a storage area just reserved in the V vector RAM.

$$V(i) = \sum_{k=0}^{31} N_{ik} \times S_k \quad (i = 0\text{--}63) \tag{3}$$

$$N_{ik} = \cos\left\{ (16+i) \times (2k+1) \times \frac{\pi}{64} \right\}$$

The V vectors obtained in step P23 are subsequently converted into U vectors in step P24. In this connection, the conversion process from the V vectors into the U vectors is carried out according to the following expressions (4) and (5).

$$U(i \times 64 + j) = V(i \times 128 + j) \tag{4}$$

$$U(i \times 64 + 32 + j) = V(i \times 128 + 96 + j) \tag{5}$$

where, i=0~7, j=0~31

As can be seen from expressions (4) and (5), to achieve the complex subband filtering process, there are required 1024 V vectors in total including 64 V vectors resultant from step P23. These 1024 V vectors are calculated at an interval of 64 sets of different subband sample data items S (each set includes 32 items) and are stored in the V vector RAM of FIG. 28 ranging from address 0 to address 1023.

Next, in step P25, a predetermined window coefficient D is multiplied by the U vector converted in step P24 to calculate 512 W vectors. Namely, the W vectors are attained in accordance with the following expression (6).

$$W(i) = U(i) \times D(i) \tag{6}$$

where, i=0~511

Moreover, in the next step P26, 32 PCM data items are calculated according to the following expression (7) using the W vectors obtained in step P25. The resultant 32 PCM data items are outputted to an external device in the next step P27.

$$PCM(j) = \sum_{i=0}^{15} W_{j+32i} \qquad (j = 0\text{--}31) \qquad (7)$$

Thereafter, whether or not the decoding process is to be terminated is decided in step P28. If the process is to be continued, control is returned to step P21 to start the PCM operation process for the subsequent 32 items. The process up to step P28 is repeatedly executed 12 and 36 times respectively for layer I and II so as to terminate the decode process for one frame.

As described above, in the MPEG audio decoder of the prior art, the input stage includes the buffer memory to store therein audio compression data including the bit stream shown in FIG. 22. In addition, since the respective information items of the bit stream are to be stored, there are individually disposed buffer memories respectively for the information items.

As a result, the buffer memories to store the respective information items require a large storage capacity equivalent to the total of the data amounts of the respective information items. This leads to a problem that quite a large storage capacity is required.

In addition, the samples included in the audio compression data have respectively different bit widths as described above. Specifically, the samples have bit widths of two bits to 16 bits. Therefore, to store a sample having the maximum bit width in an address field, it is necessary that each word includes 16 bits in any buffer memories disposed to store therein samples.

However, the samples are read in the address unit in the conventional MPEG audio decoder. When storing samples, consequently, although the samples have mutually different bit widths, each sample is stored in one field indicated by one address.

As a result, while the sample having a width of 16 bits can be appropriately stored therein, any sample having a bit width less than 16 bits is stored only in a portion of the address field. This cause a problem of many unused areas in which samples are not stored in the total storage area of the buffer memories.

Furthermore, as can be understood from expression (1) described above, to obtain the subband sample data items S in the conventional MPEG audio decoder, it is required to conduct two processes including the inverse quantization and inverse scaling processes, and the multiplication process is necessary in each of the processes.

The multiplication process generally imposes a heavy load on the system. Consequently, in the conventional system in which the multiplication process are effected twice, there is required quite a heavy operation load in total, leading to a problem of the elongated processing time.

Moreover, as described above, 1024 V vectors are necessary for one channel to generate PCM data. Therefore, the V vector RAM is required to have a memory capacity of at least 1024 words for one channel. This is as shown in FIG. 28.

Since V vectors include data of a large information quantity, there occurs a problem that the V vector RAM, to store a large number of V vectors as above, is considerably increased in storage capacity.

Furthermore, in the MPEG audio decoder achieving the process shown in FIG. 27, 64 V vectors are first calculated from one set of subband sample data items S. Thereafter, W vectors are calculated from U vectors, which are converted from the 64 V vectors, and then 32 PCM data items are created from the W vectors. In short, conventionally, the process ranging from step P21 to step S25 of FIG. 27 is necessary to generate 32 PCM data items.

Consequently, although it is not required to dispose PCM data output memories in this case, when the generated PCM data items are desired to be successively outputted as audio data to an external device, the operating section is required to include a memory to keep data to produce at least 32 PCM data items for one channel. Moreover, to provide a certain margin, there is generally employed a memory having a storage capacity of 100 words.

In consequence, to continuously output PCM data as audio data to an external device, there arises a problem that the conventional MPEG audio decoder is required to include a large-capacity memory.

SUMMARY OF THE INVENTION

It is therefore an object of the present invention to minimize the storage capacity of various memories disposed in the decoder to decode compressed data so as to achieve a series of decoding operations through processes requiring a short period of time, thereby solving the above problems at the same time.

Description will be specifically given of an example of the MPEG standard. First, the object of the present invention is to reduce the total storage capacity of buffer memories to provisionally store respective information items included in audio compression data of the MPEG standard. Second, the object of the present invention is to minimize the load imposed on operations to obtain subband sample data in the series of decoding processes. Third, the object of the present invention is to decrease the storage capacity of the buffer memory, i.e., a V vector RAM to temporarily store therein V vectors attained from the subband sample data in the process of the complex subband filtering operation. Fourth, the object of the present invention is to possibly minimize the capacity of memories disposed to continuously output PCM data items to an external device.

According to the present invention, there is provided a decoder for decoding compression data attained by conducting a compression encoding operation for digital data through a high efficiency encoding in which the data compression is conducted such that one sample is subdivided according to a frequency of a signal represented by the digital data into a set of subband samples representing frequency components of a plurality of subbands. There are extracted from each of the subband samples first information data having a variable bit length and indicating a level of the subband sample logarithmically compressed, second information data representing a factor of the logarithmic compression, third information data denoting the number of the second information items associated with a predetermined data length, and fourth information data representing at least a bit length of the first information data.

To achieve the objects above, a decoder according to a first aspect of the present invention includes first storage means for provisionally storing therein at least the second information data and fourth information data; first write means for writing at least the second information data and fourth information data in a predetermined storage area of the first storage means according to the third information data; first read means for reading at least the second information data and fourth information data from the predetermined storage area of the first storage means; second storage means for temporarily storing therein the first information data; second write means for writing the first information data in the second storage means according to the fourth information data; second read means for reading the first information data from the second storage means. The decoder further includes an operating means for conducting an inverse quantization process obtaining a bit length of each sample data from the first information data according to the fourth information data, executing an inverse scaling process attaining subband sample data indicating a level of the subband sample from each sample data through an exponent operation specified by the second information data, carrying out a complex subband filtering process combining the subband sample data related to the set of subband samples into a sequence of numeric values associated with the original digital data, and thereby obtaining the original digital data from the sequence of numeric values. The operating means further produces an operation formula by subdividing an exponent of the exponent operation into an integer part and a fraction part and conducts through a multiplication an operation related to the fraction part according to the operation formula, conducting through a shift operation an operation related to the integer part, thereby attaining the subband sample data. The operating means calculates the sequence of numeric values on the basis of the subband sample data associated with the set of subband samples. The decoder also includes a third storage means for temporarily storing therein the sequence of numeric values calculated by the operating means; third write means for writing the sequence of numeric values in a predetermined area of the third storage means; third read means for reading the sequence of numeric values from the third storage means; and output means for outputting therefrom digital data obtained by the operating means.

According to the configuration, the subband sample data can be obtained by the operation process including one addition, one multiplications, and one shift operation. Consequently, the number of multiplication increasing the operational load is reduced as compared with the conventional case.

A decoder according to the second aspect of the present invention includes storage means for storing therein sample data as the first information data; write means for writing the sample data in the storage means in a state in which an address of the write operation does not necessarily match the address boundary of the storage means; and read means for reading the sample data items from the storage means in the item-by-item fashion in a state in which an address of the read operation does not necessarily match the address boundary of the storage means.

With this provision, the conventional disadvantage of the unused storage areas is removed and it is not necessary to prepare as many addresses as there are samples to be stored.

A decoder according to the third aspect of the present invention includes first operating means for calculating a sequence of numeric values related to the original data according to the first to fourth information data items; storage means for storing therein the sequence of numeric values calculated by the first operating means; write means for writing the sequence of numeric values in a predetermined storage area of the storage means; read means for reading the sequence of numeric values from the storage means; read control means for controlling the read means to read, when a numeric value calculated by the first operating means is beforehand stored in the storage means, a portion of the sequence of numeric values to which the value belongs from the storage means; second operating means for achieving multiplications and additions according to at least the portion of the sequence of numeric values read from the storage means under control of the read control means and a predetermined coefficient, thereby producing digital data items in an item-by-item fashion; and output means for outputting, each time the original digital data is reproduced in the second operation, the digital data to an external device.

According to the fourth aspect of the present invention, there is provided a decoder for decoding compression data attained by conducting a compression encoding operation for digital data by using a high efficiency encoding. The decoder includes operating means for calculating a portion of a sequence of numeric values related to the original digital data according to the compression data, the portion of the sequence of numeric values having a correlation with another portion of the sequence of numeric values; storage means for storing therein at least the portion of the sequence of numeric values calculated by the operating means; write means for writing at least the portion of the sequence of numeric values in a predetermined area of the storage means; read means for reading at least the portion of the sequence of numeric values from the storage means; and read control means for controlling the read means to read, in response to a use request of a numeric value, the numeric value from the storage means, and for controlling the read means to read, when the requested numeric value is missing in the storage, a numeric value having a correlation with the requested numeric value from the storage means.

According to the third and fourth aspects of the present invention, the operating means need not calculate all numeric values, i.e., the original digital data can be created using the numeric values beforehand stored in the storage means. Furthermore, the digital data items are generated in the item-by-item manner and the digital data item is outputted each time the data is generated. Therefore, it is unnecessary to provide the memory to output the digital data and the memory to keep therein data for the creation of the digital data.

These decoders may be those used to to decode audio compression data conforming to the MPEG standard. Additionally, these decoders may be in conformity with other high efficient encoding methods.

BRIEF DESCRIPTION OF THE DRAWINGS

These and other objects and advantages of the present invention will become apparent by reference to the following description and accompanying drawings wherein:

FIG. 3 is a diagram showing allocation codes adopted in the decoder of the first embodiment;

FIG. 4 is a diagram showing an input order of samples supplied to the decoder of the first embodiment;

FIGS. 7A to 7E are diagrams for explaining the contents of processes in a data generator of the decoder in the first embodiment;

FIGS. 12A to 12C are diagram for comparing the total number of machine cycles between various cases when the inverse quantization and inverse scaling processes are accomplished in the pipeline process system;

FIG. 14 is a diagram showing a correlation between V vectors;

FIG. 15 is a diagram showing a relationship between addresses and V vectors in a hardware system to store V vectors;

FIG. 22 is a diagram showing a bit stream of audio compression data in layer II of the MPEG1 audio standard;

FIG. 23 is a diagram showing a relationship between allocation, sample, and sample code data in layer II of the MPEG1 audio standard;

FIG. 24 is a diagram showing a relationship between scfsi and scale factor data in layer II of the MPEG1 audio standard;

FIG. 25 is a diagram showing a relationship between index and factor values in layer II of the MPEG1 audio standard;

FIG. 26 is a diagram showing inverse quantization coefficients in layer II of the MPEG1 audio standard;

DESCRIPTION OF THE PREFERRED EMBODIMENTS

Next, description will be given of a first embodiment in which the present invention is applied to an MPEG audio decoder.

Figure 1:
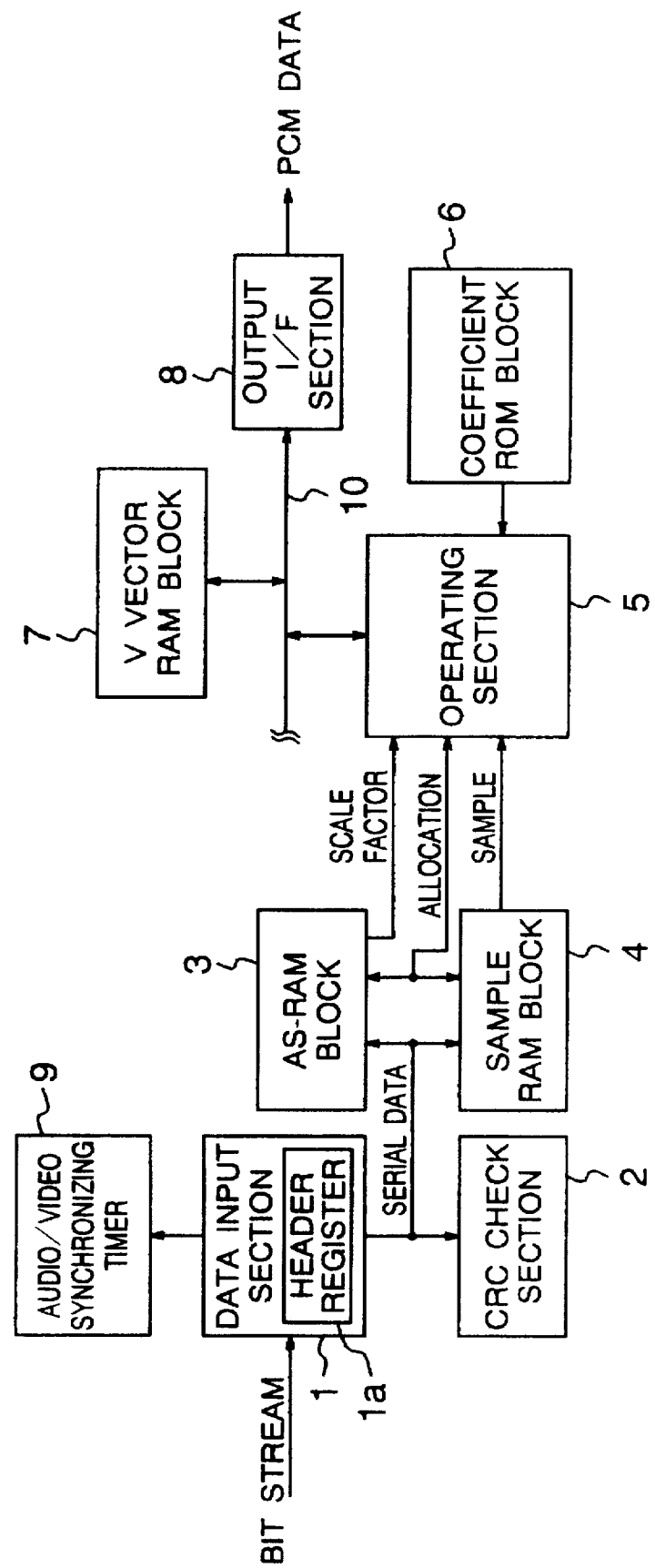
FIG. 1 is a block diagram showing the overall configuration of a decoder in a first embodiment according to the present invention.

FIG. 1 shows in a block diagram the overall construction of the decoder of the embodiment. Referring first to FIG. 1, the configuration and operation of each section of the embodiment will be briefly described.

In FIG. 1, numeral 1 is a data input section for receiving audio compression data of the MPEG standard including the bit stream shown in FIG. 22. As already described, the data is supplied to the section 1 in the bit stream order of FIG. 22. The section 1 includes a header register 1a for storing therein header information contained as the first item of the bit stream.

Numeral 2 stands for a CRC check section for checking errors in the bit stream according to the CRC (CRC check word). Namely, the section 2 compares the value of the 16-bit CRC check word with a 16-bit value resultant from a predetermined operation executed with the values respectively of the allocation, scfsi, and scale factor inputted thereto after the header and CRC check word. The section 2 then decides whether or not these values are equal to each other to thereby detect any error.

Numeral 3 designates an allocation/scale factor-RAM (AS-RAM) block for temporarily storing therein the allocation, scfsi, and scale factor sent from the data input section 1. In this embodiment, in the storage area in which the scfsi is once stored in the AS-RAM block 3, there is overwritten the scale factor inputted after the scfsi. Therefore, only the allocation and scale factor data is finally stored in the AS-RAM block 3.

Numeral 4 is a sample RAM block in which the sample sent from the data input section 1 (when a sample code is received, it is converted into a sample, which will be described later) is provisionally stored and which produces the value of S"+D of expression (1) when the sample is read therefrom.

As above, the embodiment includes the sample RAM block 4 for provisionally storing the sample, which is variable-length data, among the various information contained in the audio compression data and the AS-RAM block 4 for temporarily storing the data (allocation, scfsi, and scale factor) characteristic to the sample, the blocks 4 and 3 being arranged separatedly. This point is different from the conventional system in which there are disposed memories individually for the respective information items.

Numeral 5 denotes an operating section for executing the inverse quantization, inverse scaling, and complex subband filtering processes described above on the basis of the allocation and scale factor and the sample respectively read from the AS-RAM and sample RAM blocks, thereby producing PCM data.

Numeral 6 represents a coefficient ROM block to beforehand store therein various coefficients employed when the operating section 5 accomplishes the inverse quantization, inverse scaling, and complex subband filtering processes.

Numeral 7 is a V vector RAM block for provisionally storing therein subband sample data S attained through the inverse quantization and inverse scaling processes in the operating section 5 and V vectors obtained from the subband sample data S in the process of the complex subband filtering operation.

Numeral 8 designates an output interface section as output means to output therefrom digital PCM data obtained by the operating section 5. The PCM data is then transformed into an analogue signal by an digital-to-analogue (D/A) converter (not shown).

Numeral 9 stands for an audio/video synchronizing timer used to synchronize the PCM audio data reproduced from the audio decoder configured above with video data reproduced from a video coder (not shown).

Numeral 10 denotes a data bus on which the subband sample data S, V vectors, and PCM data attained from the operating section 5 communicate between the operating section 5, V vector RAM block 7, and output interface section 8.

Subsequently, description will be given in more detail of the construction and operation of each block of the decoder according to the embodiment configured above.

Figure 2:
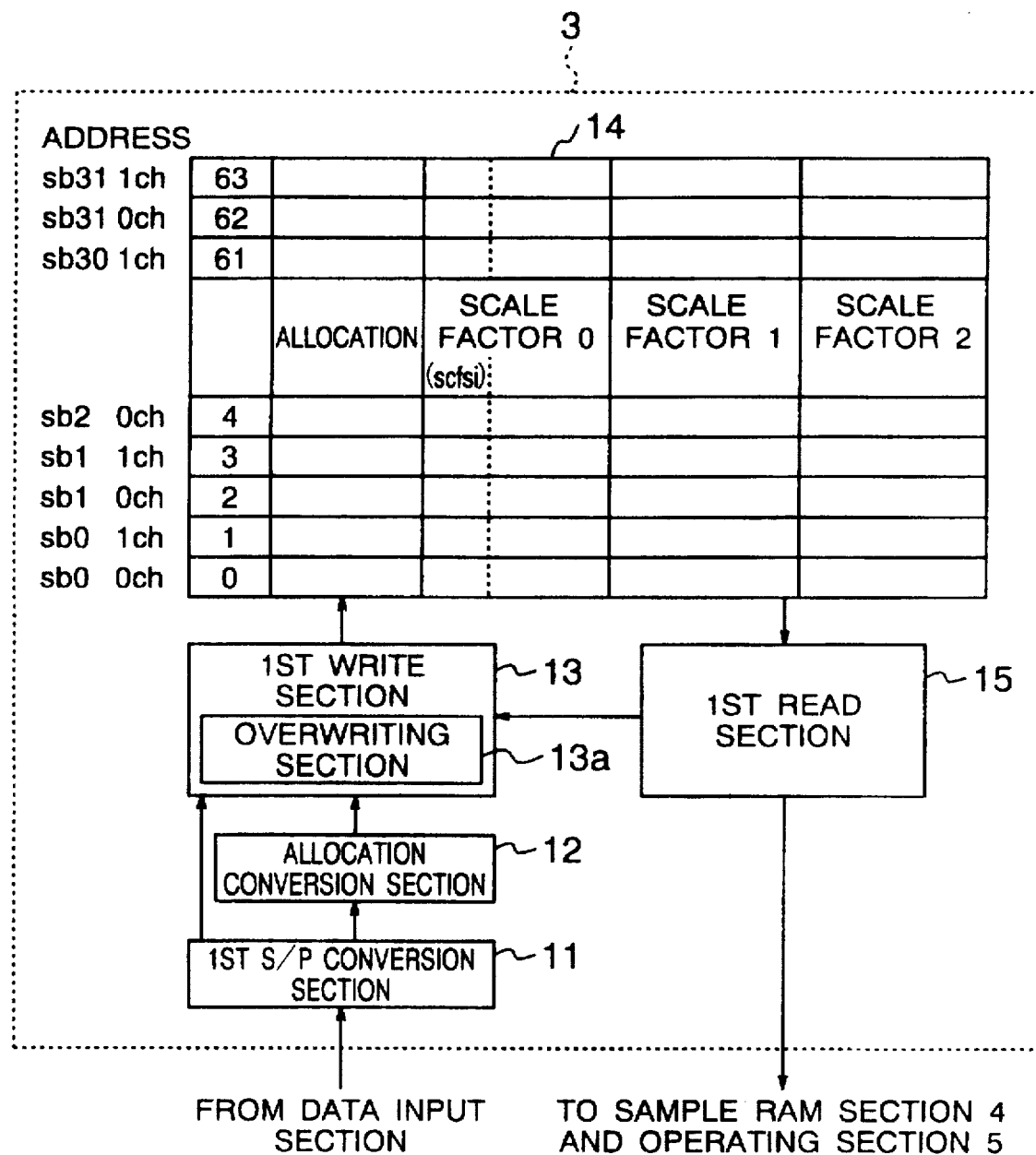
FIG. 2 is a block diagram showing the configuration of an AS-RAM block of the decoder in the first embodiment according to the present invention.

FIG. 2 shows structure of the AS-RAM block 3. As can be seen from FIG. 2, the block 3 includes a first serial-toparallel (S/P) conversion section 11, an allocation conversion section 12, a first write means 13 as scfsi/scale factor write means, an AS-RAM 14, and a first read section 15.

The first S/P conversion section 11 transforms the allocation, scfsi, and scale factor sent in the form of serial data from the data input section 1 into signals in the form of parallel data. The allocation conversion section 12 receives and converts the allocation into predetermined data, which will be described later.

Furthermore, the AS-RAM 14 is used to temporarily store therein the allocation, scfsi, and scale factor thus transformed into the parallel data. Various information items are written in and are read from the AS-RAM 14 by the first write section 13 and the first read section 15, respectively.

As shown in FIG. 2, the write section 13 includes an overwriting means 13a. The means 13a overwrites data in the AS-RAM 14 such that the scale factor is written in the memory area thereof in which preceding scfsi data is already written, which will be described later.

The allocation, scfsi, and scale factor read from the AS-RAM 14 by the first read section 15 are used or referenced in processes executed the first write section 13, sample conversion section 22 (which will be described later in conjunction with FIG. 5) of the sample RAM block, and the operating section 5 shown in FIG. 1.

Next, operation of the AS-RAM block 3 constructed above will be described. In this connection, as described above, it is assumed that the respective information items contained in the bit stream of FIG. 22 are in advance supplied in this order to the data input section 1 of FIG. 1. Consequently, for the header and CRC inputted to the input section 1 before the allocation is transferred to the AS-RAM block 3, following process has already been executed.

That is, the header is first supplied from the section 1 to be stored in the header register 1a thereof. Thereafter, the CRC is inputted from the section 1 to be transferred to the CRC check section 2. The section 2 makes a check for a bit error in the frame.

Subsequently, the allocation is supplied from the section 1 to be transferred in the form of serial data to the first S/P conversion section 11 shown in FIG. 2. In the section 11, the allocation is transformed from the serial data into parallel data in the word-by-word fashion. The allocation thus converted into the parallel data is fed via the allocation conversion section 12 to the first write section 13 to be stored in an allocation field of the AS-RAM 14.

As can be seen from the AS-RAM 14 of FIG. 2, in this embodiment, one RAM is divided into a field for allocation (allocation in FIG. 2), a field for scfsi ((scfsi) in FIG. 2), and a field for scale factor (scale factors 0 to 2 in FIG. 2).

Additionally, as described above, the audio data is divided into 32 subbands (subband no. sb=0 to 31) and is encoded for each subband, and each subband has two channels (channel no. ch=0 or 1). Therefore, the fields as the storage of the respective information items are assigned with addresses 0 to 63 to store information items of the respective channels of each subband.

One allocation is provided for each channel of the subband and is stored in the field dedicated thereto in the AS-RAM 14 in an order of [sb0,ch0], [sb0,ch1], [sb1,ch0], etc. as shown in FIG. 2. However, in layer II, allocation is missing for subbands sb30 and sb31, namely, the allocation data is stored up to sb29 (address 59).

In this connection, the allocation includes data to be used for various processes of the scfsi, scale factor, and sample data such as element subdivision thereof and decoding thereof to create PCM data. In this situation, it is inconvenient to reference the complicated table shown in FIG. 23 each time the process is executed.

According to the embodiment, to solve the above inconvenience, the allocation conversion section 12 is adopted to beforehand transform the allocation into allocation codes, for example, as shown in FIG. 3 so as to store the converted codes in the AS-RAM 14.

In the allocation code shown in FIG. 3, the most-significant bit (MSB) thereof indicates that the related information is sample data or a sample code and least-significant four bits denote the bit width of the sample. Namely, when the most-significant bit is "0", the sample data is a sample; whereas, when the bit is "1", the sample data is a sample code. Furthermore, the binary value indicated by least-significant four bits designates the bit width of the sample.

Incidentally, as can be seen from FIG. 23, since the sample bits width is other than one, information that the sample bit width is 16 is assigned to the least-significant four bits 0001 in binary notation. In addition, when the allocation code is 00000 in binary notation, it is denoted that none of the scfsi, scale factor, and sample is present for the associated subband channel.

Subsequently, when the scfsi is supplied from the data input section 1 to the system, the scfsi is transferred in the serial data format to the first S/P conversion section 11 as shown in FIG. 2. In the section 11, the scfsi is transformed from the serial data into parallel data according to the element unit (two bits). The obtained scfsi in the parallel data format is fed to the first write section 13 to be stored in the AS-RAM 14.

In the write operation of scfsi, the allocation is read by the first read section 15 from the AS-RAM 14 in the ascending address sequence such that the write operation is accomplished after it is confirmed that the allocation is other than "0" for the following reasons. As above, when the allocation is "0", the scfsi is missing for the corresponding subband channel.

That is, data of address 0 including allocation of subband sb0 channel ch0 is first read from the memory. When the obtained allocation is other than "0", the allocation and scfsi, which is converted into parallel data in the element unit as above, are again written in the memory at address 0. When the allocation is "0", only the allocation is written again therein at address 0.

Subsequently, the similar process is repeatedly accomplished up to address 63 (however, up to address 59 in the case of layer II). Through the operation, the allocation and scfsi are stored in the respectively dedicated fields of the AS-RAM 14 (in the areas indicated as allocation and (scfsi) in FIG. 2).

Next, when the scale factor is supplied from the data input section 1, the data is transferred in the serial data format to the first S/P conversion section 11. In the section 11, the scale factor is transformed from the serial data into parallel data. The scale factor thus converted into the parallel data format is delivered to the first write section 13 to be stored in the AS-RAM 14.

In the writing operation of the scale factor, the allocation and scfsi are read by the first read section 15 from the AS-RAM 14 in the ascending address order to be written therein after the contents thereof are confirmed. In short, data of address 0 including the allocation of subband sb0 channel ch0 and scfsi is first read from the memory. The allocation thus obtained is checked to decide whether or not the allocation is "0".

When the allocation is "0", the scale factor is missing in the associated subband sb0 channel ch0. Consequently, the system does not write any scale factor in the memory at address "0". On the other hand, when the allocation is other than "0", the value of scfsi is confirmed successively to decide the number of scale factors for subband sb0 channel ch0.

After the check is accomplished, the scale factor inputted in the serial data format is transformed by the first S/P conversion section 11 into the parallel data format so that the scale factor resultant from the parallel conversion and the allocation attained by the first read section 15 are again written in the memory at address 0.

The scale factor at this point of time is written in all fields of scale factors 0 to 2 in the AS-RAM 14. For example, as can be seen from FIG. 24, when the value of scfsi is 10 in binary notation, there exists only one scale factor. However, the value "a" thereof is written in all fields allocated to scale factors 0 to 2.

Incidentally, the scfsi indicates the number of scale factors following the scfsi for each channel of the pertinent subband. Therefore, once the scfsi is read to confirm the number of the subsequent scale factors, it is unnecessary to check thereafter the number of the scale factors.

In this situation, according to the embodiment, when writing the scale factor in the memory, the scfsi read from the memory together with the allocation is not again written in the memory at address 0. Thereafter, as shown in FIG. 2, when the scale factor is written in the memory, a portion of the field of scale factor 0 is overlapped with the scfsi field. Namely, when storing the scale factor in this embodiment, the portion of scale factor is overwritten in the field in which the scfsi is already written.

Subsequently, the process is similarly effected in the repetitious manner up to address 63 (however, up to address 59 in the case of layer II). As a result, the allocation and scale factor are stored in the respectively dedicated fields of the AS-RAM 14 (areas designated as allocation and scale factors 0 to 2 in FIG. 2).

As above, in the embodiment, one AS-RAM 14 is subdivided into the fields of allocation, those of scfsi and those of scale factors (a portion the field is overlapped with the scfsi field) such that after the scfsi is once read, the subsequent scale factor is written in the scfsi field).

In consequence, according to the embodiment, a portion of the overall storage area of the AS-RAM 14 can be shared between the memory area to temporarily store the scfsi and the memory area to provisionally store a portion of scale factor. Therefore, the buffer memory dedicatedly used to store the scfsi can be dispensed with and hence the total storage capacity is minimized as compared with the prior art in which the scfsi dedicated buffer memory is separately provided.

In this regard, the allocation, scfsi, and scale factor are stored in one AS-RAM 14 in the embodiment. However, in accordance with the present invention, at least the scfsi and scale factor are only required to be stored in one RAM. Namely, the allocation need not be necessarily stored in the same RAM.

Next, when sample data is inputted from the data input section 1 as shown in FIG. 1, the data is transferred to the sample RAM block 4. In this connection, the sample data is supplied to the input section 1 in the order denoted by arrows in FIG. 4.

In other words, defining each sample data as sp(ch,sb,GR) in which 36 sample data items along the time axis direction of one frame are divided into groups each including three data items to be classified into groups 0 to 11 and the sequence number GR(=0 to 2) is assigned in each group, the sample data items are supplied to the data input section 1 in an order of sp(0,0,0), sp(0,0,1), sp(0,0,2), sp(1,0,0), sp(1, 0,1), sp(1,0,2), sp(0,1,0), . . . , sp(1,31,2) to be stored in the sample RAM block 4.

Figure 5:
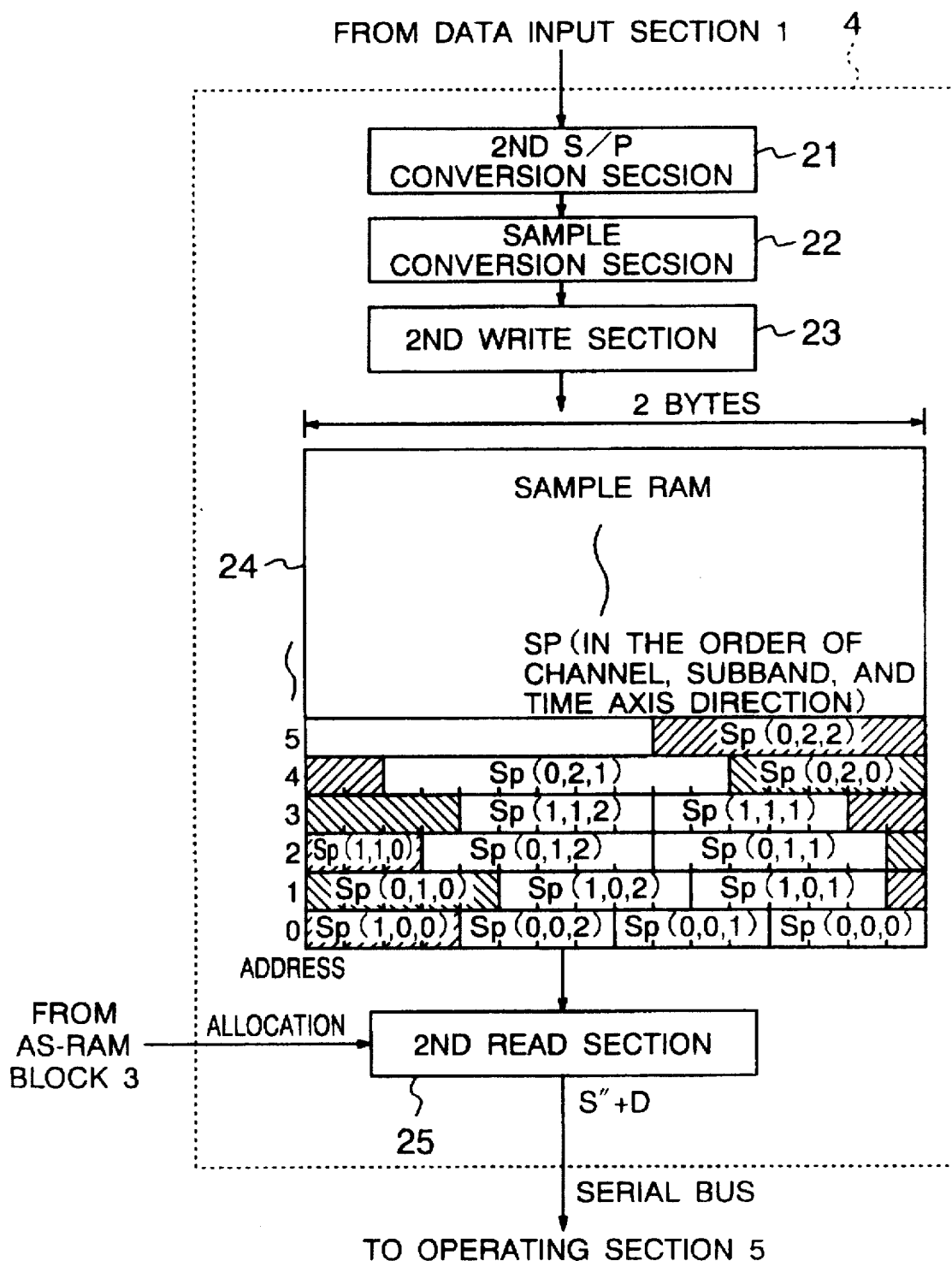
FIG. 5 is a block diagram showing the configuration of a sample RAM block of the decoder in the first embodiment.

The sample RAM block 4 includes, as shown in FIG. 5, a second S/P conversion section 21, a sample conversion section 22, a second write section 23 as sample write means, a sample RAM 24, and a second read section 25 as sample read means.

In this configuration, the second S/P conversion section 21 transforms a sample or sample codes sent in the serial data format from the data input section 1 into parallel data. When a sample code is inputted, the sample conversion section 22 subdivides the code into three sample information items.

Additionally, the sample RAM 24 is used to temporarily store therein the sample converted in the parallel data. Data read and write operations are conducted in the sample RAM 24 by the second write and read sections 23 and 25. In this regard, one word of the sample RAM 24 is designed according to the maximum bit width, i.e., 16 bits (two bytes) of the sample.

Sample data sent in the serial data format from the data input section 1 to the sample RAM block 4 is first fed to the second S/P conversion section 21. In the section 21, the sample data is transformed from the serial data format into the parallel data format in the two-byte unit. The resultant sample data in the parallel format is fed via the sample conversion section 22 to the second write section 23 to be memorized in the sample RAM 24.

Incidentally, when writing the sample data in the RAM 24, the number of bits of the sample data transferred from the input section 1 is counted and allocation information indicating the pertinent subband and channel information is simultaneously read from the AS-RAM 14 as shown in FIG. 2. As a result, the subband and channel related to the transferred sample data are continuously monitored.

In short, in the write operation of the sample data, the bit width thereof and decision of sample data for a sample or sample code can be confirmed on the basis of the allocation read from the AS-RAM 14.

Moreover, when the supplied sample data includes a sample code, the code is subdivided by the sample conversion section 22 into three samples to be stored in the sample RAM 24. Incidentally, to extract three samples from the sample code, there is executed the following process.

```
for (i = 0; i < 3; i++) {
    s[i] = c % nelvels
    c = c div nelvels
}
``` where, s[i] (i=0 to 2): three samples, c: the initial value is a sample code, nelvels: 3, 5, or 9, %: remainder, div: quotient.

As can be seen from FIG. 5, when writing a plurality of samples having mutually different bit widths by the second write section 23 of the embodiment, each sample is not stored in one word of the sample RAM 24, but the samples are stored in the words in a successive manner.

As a result, several samples are stored in the RAM 24 at the same address. Furthermore, as indicated by the shadow portion, when a remaining storage area at an address is insufficient to store a sample, the storage area at the subsequent address is also used to store the sample. Namely, it often occurs that one sample astrides two addresses in the storage.

In other words, a plurality of samples are stored in the sample RAM block 4 according to an order of sp(0,0,0), sp(0,0,1), sp(0,0,2), sp(1,0,0,), sp(1,0,1), sp(1,0,2), sp(0,1,0), . . . , sp(1,31,2) in the ascending address sequence. As above, the boundaries of samples written in the RAM 24 do not necessarily match those of the respective addresses in the embodiment, namely, it can be said that the data alignment is not established in the RAM 24. This storage state will be called "mis-align state" herebelow.

As described above, the allocation, scale factor, and sample are stored in the AS-RAM 14 and sample RAM 24 in this order such that when a predetermined amount of data is stored therein, the data is read therefrom by the first and second read sections 15 and 25 to be delivered to the operating section 5.

The second read section 25 accesses the sample RAM 24 in which the plural samples are stored in the mis-aligned state so as to read therefrom the samples in the sample-by-sample fashion. Moreover, the section 25 adds the obtained sample to a predetermined inverse quantization coefficient D to output therefrom the result of addition.

That is, when a sample is stored in the RAM 24 at one address, the second read section 25 reads the sample therefrom. In addition, when the sample astrides two addresses, the section 25 reads the sample therefrom according to two addresses. In the operation, the section 25 inverts the most-significant bit (MSB) of the attained sample.

Thereafter, the obtained sample with the inverted MSB is added to the predetermined inverse quantization coefficient D. In this connection, the inverse quantization coefficient D to be added to the sample read from the RAM 24 is decided according to the value of the allocation.

Figure 6:
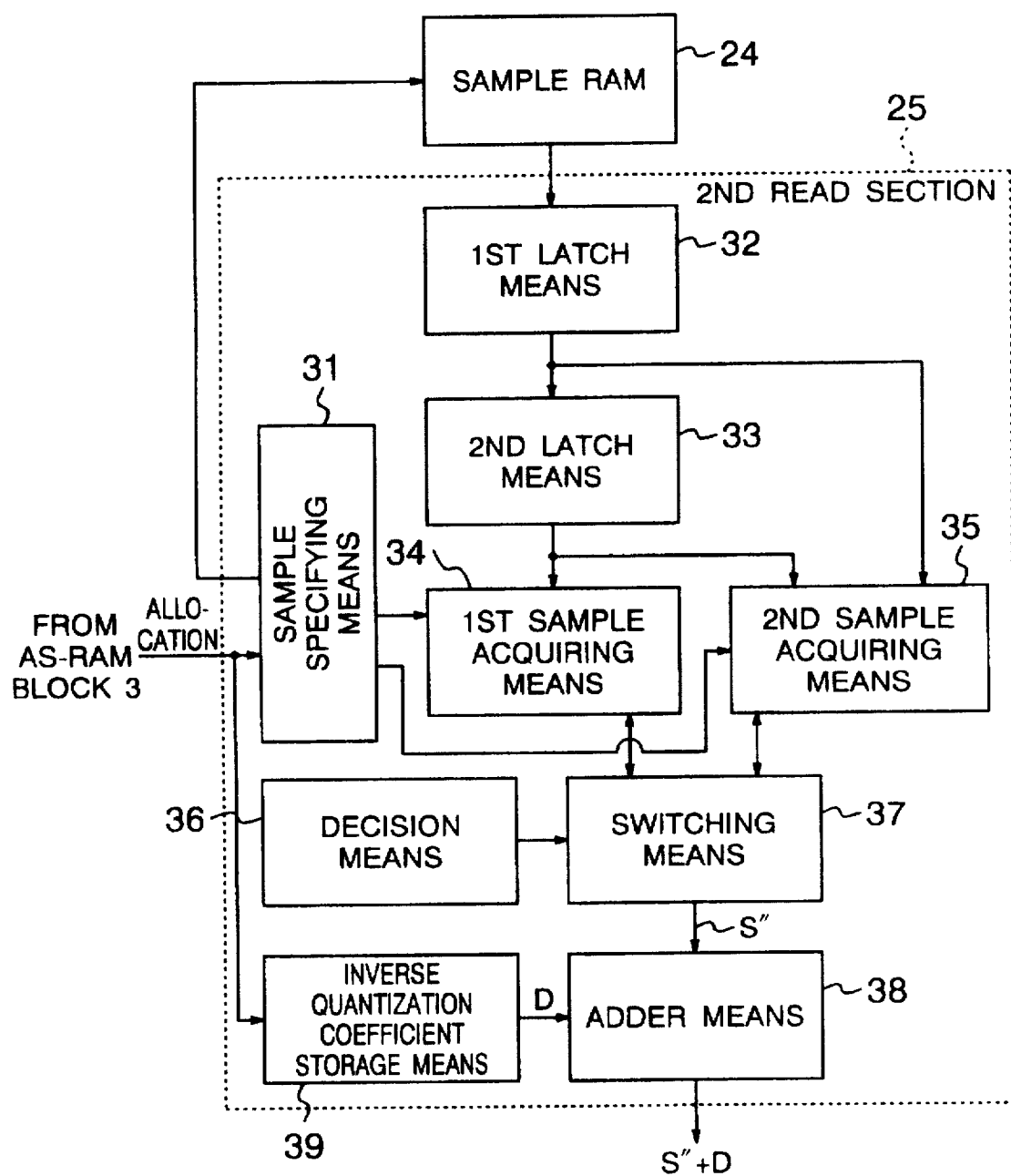
FIG. 6 is a block diagram showing the configuration of a second read section of the decoder in the first embodiment.

FIG. 6 shows in a block diagram the configuration of the second read section 25. As shown in FIG. 6, the section 25 includes sample specifying means 31, first and second latch means 32 and 33, first and second sample acquiring means 34 and 35, decision means 36, switching means 37, adder means 38, and inverse quantization coefficient storage means 39.

The sample specifying means 31 is used to specify an address of a sample and a position in the sample to be read from the sample RAM 24. The first latch means 32 sequentially holds therein data (including several samples) read from the the RAM 24 at an address specified by the means 31. The latch means 32 of the embodiment includes 16 bits. The second latch means 33 sequentially holds an output from the first latch means 32 and similarly includes 16 bits.

The first sample acquiring means 34 attains one sample from the 16-bit data stored in the second latch means 33. When one sample is stored in an area of one address, the means 34 acquires only the sample according to the 16-bit data of the address.

Specifically, as shown in FIGS. 7A and 7B, the sample (indicated by the shade portion of FIG. 7A) included in the 16-bit data held in the second latch means 33 is shifted right a predetermined number of bits to set the first position thereof to the first position of one word. Moreover, each bit of one word other than the shifted sample (shade portion of FIG. 7B) is set to "0", thereby obtaining only the sample as the object of the read operation. In this operation, the MSB of the atrained sample is reversed.

In addition, the second sample acquiring means 35 gets one sample from each 16-bit data held in the first and second latch means 32 and 33. When one sample astrides two addresses in the storage, the means 35 acquires only the sample as the read object according to the 16-bit data items respectively of two addresses.

Concretely, as shown in FIGS. 7C to 7E, the sample (indicated by the shade portion of FIG. 7D) included in the 16-bit data held in the second latch means 33 is shifted right a predetermined number of bits to align the first position thereof to the first position of one word. Furthermore, the remaining portion (shade portion of FIG. 7C) of the sample contained in the 16 bit data held in the first latch means 32 is shifted left to immediately follow the sample shifted right, thereby creating the sample (shade portion of FIG. 7E) as the target of the read operation.

In this way, each bit of the word other than the created sample is set to "0" and the MSB of the resultant sample is inverted so as to obtain the sample as the read object from the 16-bit data of respective two addresses.

The decision means 36 shown in FIG. 6 decides whether one sample to be read from the sample RAM 24 is in an area indicated by one address or two addresses. The switching means 37 is responsive to the result of decision in the means 36 to conduct a switching operation for the selection of the first sample acquiring means 34 or the second sample acquiring means 35 so as to output sample S" obtained by the selected means 34 or 35 to the adder means 38 in the succeeding stage.

The inverse quantization coefficient storage means 39 is an ROM for storing an inverse quantization coefficient and outputs coefficient D corresponding to the allocation supplied from the AS-RAM block 37 to the adder means 38.

The means 38 adds coefficient D to sample S" acquired in the state in which the MSB thereof is inverted. The addition result (S"+D) is fed to the operating section 5 of FIG. 1 to be utilized for the inverse quantization and inverse scaling processes.

Figure 8:
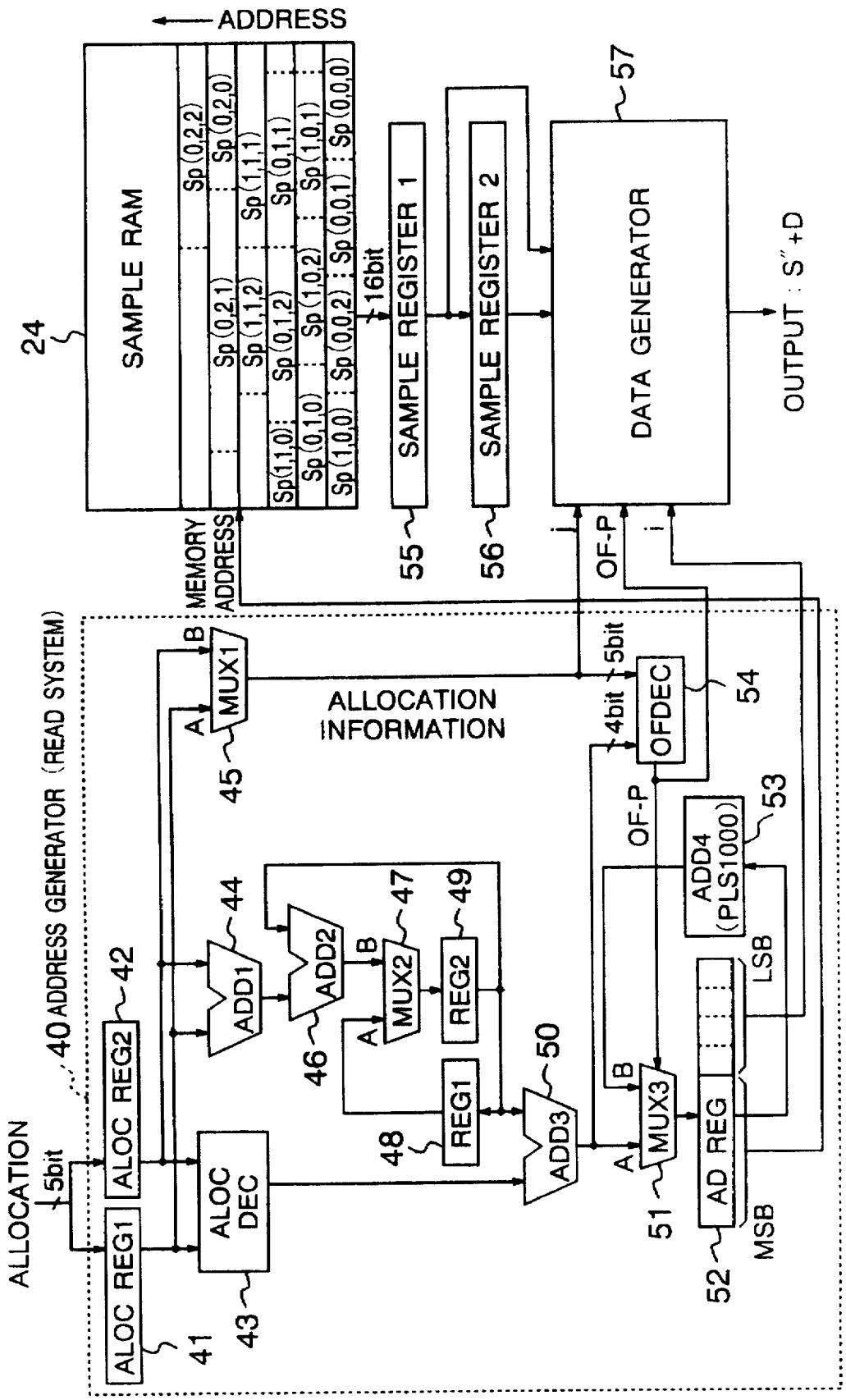
FIG. 8 is a diagram showing a specific construction of the second read section of FIG. 5.

FIG. 8 shows in a circuit diagram the specific construction of the second read section 25 of FIG. 6.

In FIG. 8, numeral 40 indicates a first address generator, which includes the sample specifying means 31 and decision means 36 of FIG. 6. Numerals 41 and 42 respectively stand for first and second allocation registers to hold therein allocations inputted from the AS-RAM 14 of FIG. 2.

In this connection, the first and second registers 41 and 42 keeps therein allocations respectively associated with channels ch0 and ch1. The allocation values respectively kept in the registers 41 and 42 will be respectively represented as a10 and a11 herebelow.

As described above, in the operation of layer II, the allocation is beforehand transformed by referring to the predetermined allocation table of FIG. 3 conforming to the MPEG1 standard into a value representing the bit width of the pertinent sample to be stored in the AS-RAM 14. Therefore, the allocation values a10 and a11 respectively denote the bit widths of the respectively associated samples.

Figures 9, 10:
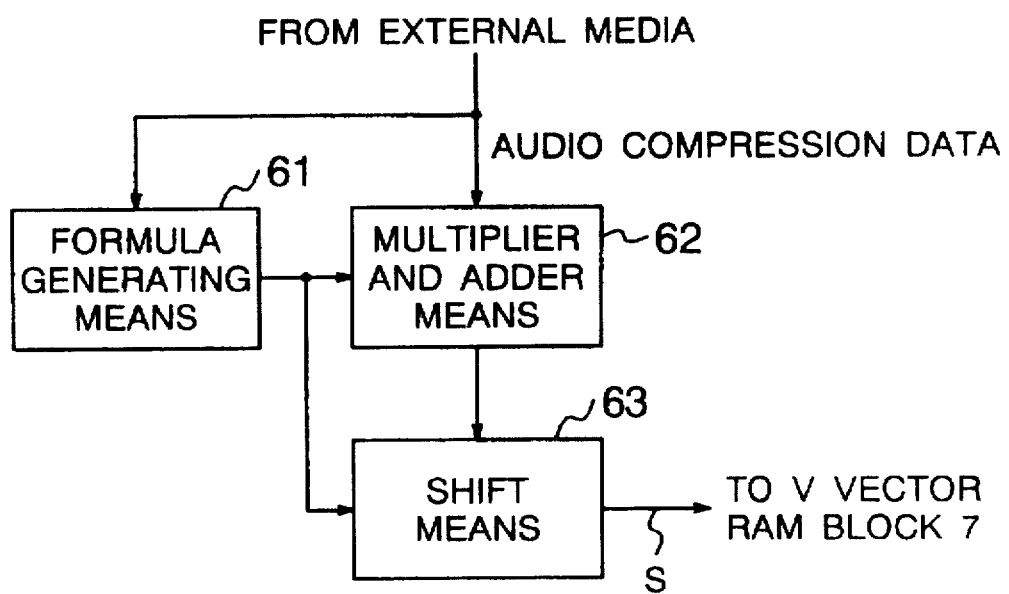
FIG. 9 is a diagram showing the contents of processes in an allocation decoder in the decoder of the first embodiment.
FIG. 10 is a block diagram showing constitution to attain subband sample data through an inverse quantization process and an inverse scaling process in the decoder of the first embodiment.

Numeral 43 designates an allocation decoder to sequentially receive as inputs thereto allocations from the first and second allocation registers 41 and 42 to produce data representing a predetermined value according to the process contents shown in FIG. 9.

For example, when the received allocation corresponds to channel number denoted as ch=0 and the intra-group number is expressed as GR=0, the decoder 43 produces data "0" as the above-mentioned data representing the predetermined value. Additionally, when the received allocation is associated with channel number indicated as ch=0 and the intra-group number is designated as GR=1, the decoder 43 outputs as the predetermined value therefrom the bit width of the sample related to the allocation. When the inputted allocation is related to any channel number and intra-group number other than those above, the decoder 43 calculates the predetermined value according to an associated computing formula of FIG. 9 to output therefrom the obtained value.

In FIG. 8, numeral 44 stands for a first adder to accomplish the following operation using the allocation values a10 and a11 stored in the first and second allocation registers 41 and 52.

$$(a10+a11)\times 3$$

Numeral 45 denotes a first selector to select either one of the allocations kept in the registers 41 and 42 to output therefrom the selected item.

Numeral 46 indicates a second adder to add data outputted from the first adder 44 to that delivered from the second register 49. In this regard, the second register 49 keeps therein data fed from a second selector 47. The selector 47 selects either one of the data outputted from the second adder 46 and that fed from the first registers 48.

In addition, the first register 48 stores therein data supplied from the second register 49. Incidentally, in the initial stage of the decode process, the value expressing the position of MSB of sample sp(0,0,0) is stored in the first register 48 in advance.

Numeral 50 represents a third adder for adding data outputted from the allocation decoder 43 to that produced from the second register 49. Numeral 51 indicates a third selector used to select either one of the data delivered from the third adder 50 and that created from the fourth adder 53. In this structure, the fourth adder 53 adds a decimal value "16", i.e., binary value "1000" to the data sent from the address register 52 to output therefrom the resultant data.

The address register 52 keeps therein data sent from the third selector 51. The data stored in the register 52 designates the address of a sample to be read from the sample RAM 24 and the MSB position in the address.

Numeral 54 denotes a decoder which adds data delivered from the first selector 45 to that outputted from the third adder 50 to thereby decide whether or not the result of addition is equal to or more than 17 in decimal notation. When the result is equal to or more than 17, the decoder 54 outputs control signal OF-P at a "Hi" level in the next machine cycle. Otherwise, the decoder 54 outputs control signal OF-P at a "Lo" level in the next machine cycle. The decoder 54 corresponds to the decision means 36 shown in FIG. 6.

Numeral 55 stands for a first sample register to sequentially keep therein 16-bit data read from each address of the sample RAM 24. Numeral 56 represents a second sample register to sequentially store therein data sent from the first sample register 55. The first and second sample registers 55 and 56 respectively correspond to the first and second latch means 32 and 33 shown in FIG. 6.

Numeral 57 indicates a data generator which acquires only one sample S" as the read object from 16-bit data items respectively kept in the first and second sample registers 55 and 56 to add the inverse quantization coefficient to the attained sample S". The data generator 57 includes the first and second sample acquiring means 34 and 35, switching means 37, and adder means 38 shown in FIG. 6.

Subsequently, description will be given of operation of the sample storage block constructed as shown in FIG. 8. In the description, a sequence of operations will be subdivided according to cycles. First, description will be given of operation of the first address generator 40 enclosed in a dotted line in FIG. 8.

① First cycle

First, an allocation corresponding to subband sb0 and channel ch0 as well as an allocation associated with subband sb0 and channel ch1 are supplied from the AS-RAM 14 shown in FIG. 2 to be kept in the first and second allocation registers 41 and 42, respectively.

At the same time, the second selector 47 selects data to be inputted to terminal A. As a result, the data stored in the first register 48 is fed to be kept in the second register 49. Since the initial value "0" is loaded in the first register 48 at decode initiation, "0" is stored in the second register 49.

Additionally, the allocation decoder 43 calculates a predetermined value according to the allocations kept in the first and second allocation registers 41 and 42 and then transmits the resultant value to the third adder 50. For example, in a case in which channel number and intra-group number are specified as ch=0 and GR=0, there is produced a predetermined value "0" according to the process contents of FIG. 9 shown above.

Furthermore, the first selector 45 selects data on terminal A. As a result, the allocation data kept in the first allocation register 41 is outputted to the decoder 54.

The decoder 54 adds the data delivered from the first selector 45 to four low-order bits of the data fed from the third adder 50 to decide whether or not the result of addition is equal to or more than 17 in decimal notation.

The least-significant four bits of data from the adder 3 designate the MSB position in the word of the sample to be read from the sample RAM 24. Moreover, the data from the selector 45 indicates the bit width of the sample. Therefore, the result of addition from the decoder 54 denotes the position of the least-significant bit (LSB) of the sample to be read from the sample RAM 24.

Consequently, when the result of addition is equal to or more than 17 in decimal notation, it can be decided that the sample astrides two addresses of the sample RAM 24.

The decoder 54 outputs in the following second cycle control signal OF-P which takes the "Hi" or "Lo" value according to the decision result above and then supplies the signal to a control terminal of the third selector 51. In this connection, terminal A of the selector 51 is in the selected state in the first cycle. Therefore, the data delivered from the third adder 50 is selected to be fed to the address register 52 in the subsequent stage.

② Second cycle

Next, the data from the third selector 51 is kept in the address register 52. In this operation, data of the high-order bits other than the least-significant four bits of the address register 52 designates the MSB address of the sample to be read from the sample RAM 24.

The data of high-order bits above is sent to an address input section, not shown, of the sample RAM 24. Resultantly, the 16-bit data is read from the RAM 24 at the specified address such that the data is then kept in the first sample register 55 in the subsequent third cycle.

Furthermore, in the second cycle, the value of control signal OF-P is determined according to the data supplied to the decoder 54 in the first cycle. When the value of control signal OF-P is "Hi", the third selector 51 selects data inputted to terminal B. In consequence, data obtained by adding a decimal value "16" to the data kept in the address register 52 is outputted from the third selector 51. On the other hand, when the value of control signal OF-P is "Lo", the third selector 51 chooses data inputted to terminal A. Therefore, the value delivered from the third selector 51 is the same as that outputted therefrom in the first cycle.

③ Third cycle

Data supplied from the third selector 51 is kept in the address register 52. In this situation, data of the high-order bits other than the least-significant four bits of the address register 52 designates the LSB address of the sample to be read. The data of high-order bits is sent to an address input section, not shown, of the sample RAM 24 in the same manner as for the second cycle.

As a result, the 16-bit data stored at the specified address is read therefrom to be kept in the first sample register 55 in the next fourth cycle. In this regard, the 16-bit data kept in the first sample register 55 in the second cycle is stored in the second sample register 56 similarly in the following fourth cycle.

At the same time, the subsequent allocation is stored in the first and second allocation registers 41 and 42. Additionally, the second selector 47 selects data inputted to terminal B, i.e., the result of addition from the second adder 46.

Assume that the allocation values kept in the first and second allocation registers 41 and 42 in the first cycle are a100 and a110, respectively. Since the data in the second register 49 is "0", the data value outputted from the adder 46 is:

(a100+a110)×3

This value is consequently kept as its current value in the second register 49.

In addition, the first selector 45 selects terminal A and hence the allocation a101 kept in the first allocation register 41 in the third cycle is outputted to the decoder 54. The decoder 54 adds the data from the first selector 45 to the least-significant four bits of data from the third adder 50 to decide whether or not the result of addition is equal to or more than 17 in decimal notation. Through the operation, it is determined whether or not the next sample as the read object astrides two addresses in the sample RAM 24.

The decoder 54 outputs control signal OF-P having a value of "Hi" or "Lo" according to the decision result in the subsequent fourth cycle to supply the signal to the control terminal of the third selector 51. Incidentally, the third selector 51 chooses terminal A in the third cycle. As a result, the data sent from the third adder 50 is selected to be delivered to the address register 52 in the next stage.

④ Fourth cycle

The data outputted from the third selector 51 is stored in the address register 52. On this occasion, data of the high-order bits other than the least significant four bits of the address register 52 indicates the MSB address of the next sample to be read. The data of high-order bits is transmitted to an address input section, not shown, of the sample RAM 24 in a manner similar to that used in the second cycle.

Resultantly, the 16-bit data stored at the specified address is read therefrom so as to be stored in the first sample register 55 in the following fifth cycle. In this connection, the 16-bit data kept in the first sample register 55 in the third cycle is stored in the second sample register 56 similarly in the subsequent fifth cycle.

⑤ Fifth cycle

The process is executed in substantially the same fashion as for the third cycle described above.

Figure 4:
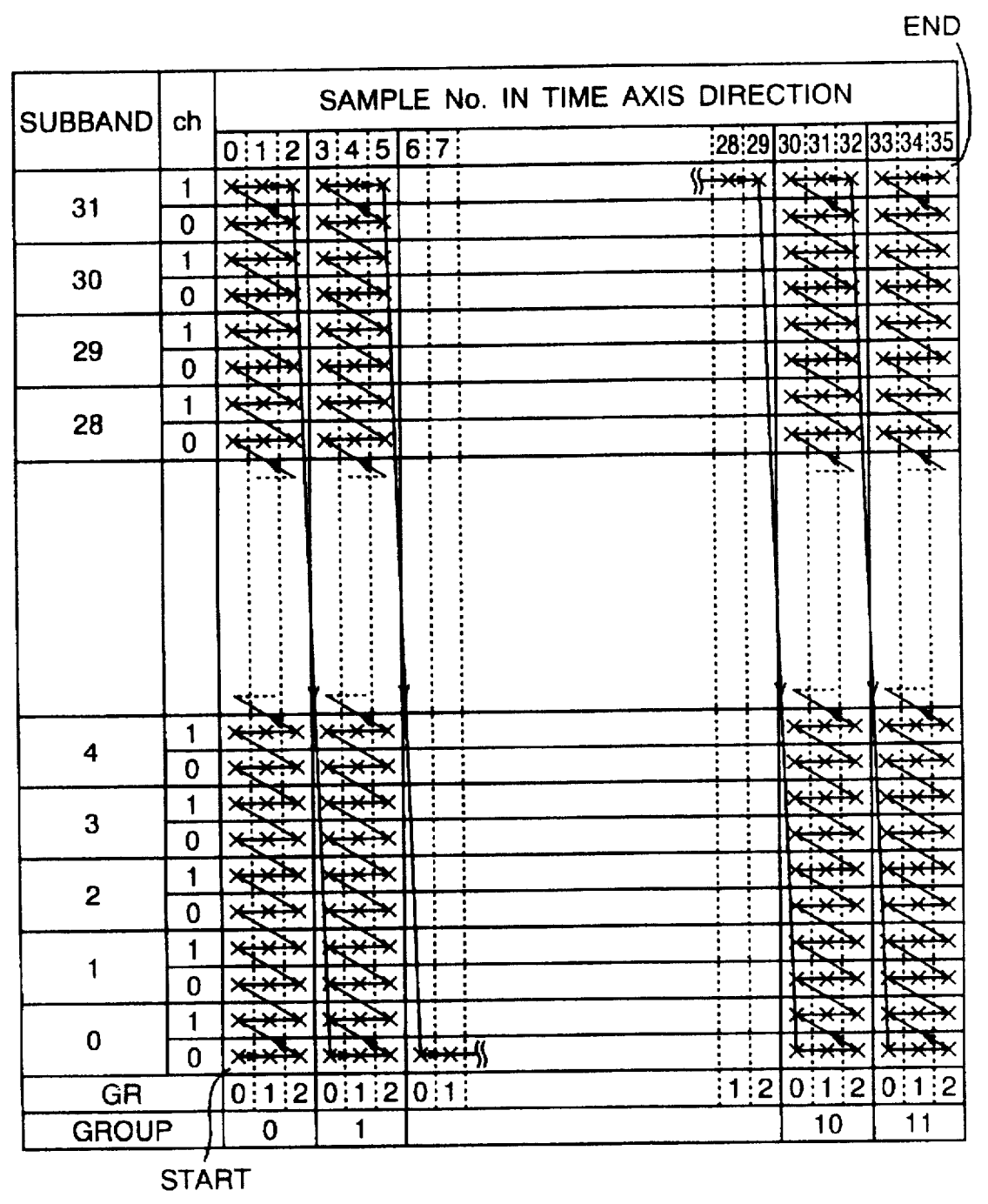

Through the processes accomplished in a repetitious way, samples are first read from the storage for the respective subbands sb0 to sb31 of sample no. 0 and channel ch0 viewed in the time-axis direction of FIG. 4. Moreover, in the next step, samples are read therefrom for the respective subbands sb0 to sb31 of sample no. 0 and channel ch1 along the time-axis direction.

In this regard, when reading samples in association with subband sb0 and channel ch1, the second selector 47 first selects data on the side of terminal A such that data kept in the second register 49 is stored in the first register 48.

Subsequently, the read process is similarly accomplished for sample numbers 1 and 2 along the time-axis direction. After the read operation of samples is completely finished for group 0, and when the sample read operation is then initiated for group 1, the value of the first register 48 is first updated. That is, after the computation of group 0, the value represented by the following expression (8) is kept in the second register 49. In the update operation, the value is stored in the first register 48.

$$\sum_{n=0}^{31} (al_{0n} + al_{1n}) \times 3 \qquad (8)$$

By executing in a similar manner the processes above for groups 0 to 11, the read operation is completed for the sample of one frame.

Referring now to FIGS. 7A to 7E and FIG. 8, description will be given of the process contents executed by the data generator 57 in concurrence with the processes of the first to fifth cycles.

As described, the data generator 57 reads one sample S" as the read object from the 16-bit data items kept in the first and second sample registers 55 and 56 and then executes an addition of the inverse quantization coefficient to the attained sample S" in layer II.

As can be seen from FIG. 8, the data generator 57 receives as inputs thereto the least-significant four bits i of data kept in the address register 52, allocation j outputted from the first selector 45, and control signal OF-P sent from the decoder 54. In this situation, the data generator 57 acquires one sample according to these data values as control inputs.

The least-significant four bits i of data kept in the address register 52 indicate the intra-word position of the sample to be read from the sample RAM 24. Additionally, the value of allocation j designates the bit width of the sample as the read object. Moreover, control signal OF-P outputted from the decoder 54 denotes whether or not the sample to be read astrides two addresses in the sample RAM 24.

When the value of control signal OF-P is "Lo", the 16-bit data kept in the second sample register 56 is shifted right by i bits so that one sample included in the 16-bit data is aligned to the first position of one word as shown in FIGS. 7A and 7B.

In addition, (16−j) bits of each word other than the shifted sample are set to "0" so as to acquire only one sample as the read object. In this operation, the MSB of the obtained sample is inverted to thereby attain the target sample S".

Furthermore, when the value of control signal OF-P is "Hi", the 16-bit data kept in the second sample register 56 is shifted right by i bits so that a portion of one sample included in the 16-bit data is aligned to the first position of one word as shown in FIGS. 7C to 7E.

Additionally, the 16-bit data kept in the first sample register 55 is shifted left by (16−i) bits so that the remaining portion of the sample contained in the 16-bit data immediately follows the sample shifted right by i bits. As a result, there is produced one sample as the read object.

The (16−j) remaining bits other than the sample thus produced are set to "0" and the MSB of the attained sample is inverted such that only one sample S" as the read object is acquired from the 16-bit data items at the respective addresses.

Subsequently, the sample S" obtained as above is added to inverse quantization coefficient D having a value corresponding to allocation j, thereby obtaining the value of (S"+D) of expression (1).

According to the embodiment above, there is provided a configuration (second read section 25) to access the sample RAM 24 in which samples are stored in the mis-align state so as to read samples therefrom in a sample-by-sample fashion. Consequently, the second write section 23 can successively write a plurality of samples having mutually different bit widths in the storage area of the sample RAM 24 so that two or more samples can be stored in an area indicated by one address.

Thanks to the provision, the unused areas in which samples are not stored are missing in the overall storage area of the sample RAM 24, leading to an efficient use of the storage area of the sample RAM 24. Furthermore, it is unnecessary to allocate addresses as many as there are samples to be stored in the area and hence the storage capacity of the sample RAM 24 to store therein all samples of one frame can be possibly minimized.

In addition, according to the embodiment, one sample may be stored in an area associated with two addresses in the sample RAM 24 depending one cases. In consequence, when acquiring one sample S" therefrom, there are conducted two memory address accesses such that data items thus attained are stored in the first and second sample registers 55 and 56. Thereafter, one sample is acquired from these data items.

Consequently, assuming that the process is conducted in a pipeline process, the period of time of addition S"+D can be sufficiently afforded while the storing operation above is being executed. Therefore, in accordance with the embodiment, the read process of sample S" and the addition process S"+D can be accomplished in one machine cycle.

In contrast therewith, according to the prior art, the latch or storage process is not executed while one sample is being read. Moreover, the addition S"+D is accomplished by a separate multiplier-adder arranged to conduct the inverse quantization process and inverse scaling process. Therefore, the prior art requires two machine cycles to execute the read process of sample S" and addition process of S"+D.

As above, when the sample is read from the sample RAM 24 to be fed to the operating section 5 shown in FIG. 1, the section 5 carries out the decode process for the sample through the inverse quantization, inverse scaling, and complex subband filtering processes to thereby produce PCM data.

Incidentally, even while the decode process is being executed, the bit stream of audio compression data is continuously inputted from the data input section such that the respective information items are sequentially stored in the AS-RAM 14 shown in FIG. 2 and the sample RAM 24 of FIGS. 6 or 8.

Next, the decode process will be described. In the process, subband sample data S is first attained. Conventionally, data S is calculated according to expressions (1) and (2). As shown in FIG. 25, since the scale factors correspond to the values of "index" ranging from 0 to 62, the exponent of expression (2) can be subdivided into integer part m and fraction part n to transform expression (2) into expression (9).

$$factor = 2^{1-index/3} = 2^{-m} (2^{-n/3}) \quad (9)$$

where, $m = -1 \sim 19, n = 0 \sim 2$

Consequently, expression (1) can be transformed into expression (10) by using expression (9).

$$S = 2^{-m} \cdot (2^{-n/3} \times C) \times (S'' + D) \quad (10)$$

Moreover, substituting $2^{-n/3} \times C = C'$ in expression (10), $$S = 2^{-m} \cdot C' \times (S'' + D) \quad (11)$$

is obtained.

In the embodiment, the inverse quantization and inverse scaling processes are accomplished according to expression (11) to attain subband sample data S. In the operation, since the calculation of $2^{-m}$ of expression (11) can be achieved by a shift operation, subband sample data S is obtained through an operation process including one addition, one multiplication, and one shift operation.

As already commonly known, the operation load of the shift operation is considerably smaller than that of the multiplication. Consequently, according to the present invention, the operation load of the operation process to attain subband sample data S can be remarkably minimized when compared with the prior art in which the multiplication having a heavy operation load is effected twice.

FIG. 10 shows in a block diagram a simplified configuration to achieve the technology above. In FIG. 10, numeral 61 stands for expression generator means to transform an expression conforming to the conventional standard into a new expression which is used to conduct the inverse quantization and inverse scaling processes for the audio compression data of the MPEG standard.

In other words, the exponent of the operation value identified by the scale factor value contained in the audio compression data supplied from an external media such as a compact disk, not shown, is divided into an integer part and a fraction part to thereby transform the conventional expression (1) into expression (11) according to the above embodiment.

Numeral 62 represents multiplier and adder means responsive to the expression generated by the expression generator means 61 to conduct by the multiplication and addition operations other than those related to the integer part for the audio compression data inputted thereto. Namely, the means conducts operation C'×(S"+D) of expression (11).

Numeral 63 designates shift means to achieve an operation related to the integer part of the expression generated by the means 61 for the result of operation from the multiplier and adder means 62. That is, the means 63 executes the operation of the multiplication of $2^{-m}$ in expression (11) to attain subband sample data S and then delivers data S to the V vector RAM block 7.

As can be understood from the description above, the multiplier and adder means 62 includes the adder means 38 shown in FIG. 6 and the value of (S"+D) has been already attained by the sample RAM block 4 of FIG. 1. Moreover, the multiplication section and shift means 63 in the multiplier and adder means 62 are included in the operating section 5 so as to execute the remaining operations of expression (11).

Figure 11:
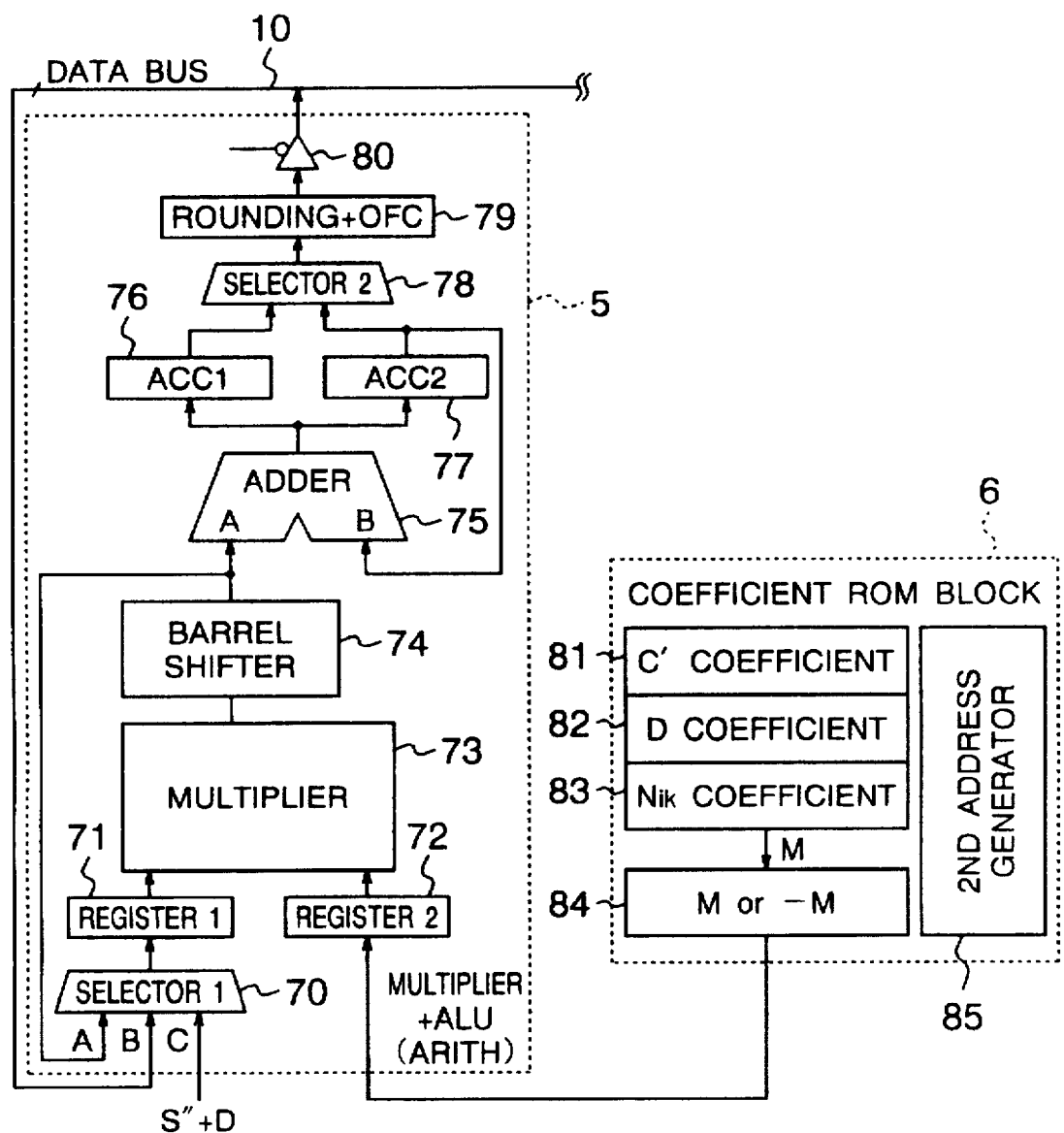
FIG. 11 is a block diagram showing structure of an operating section and a coefficient ROM block in the decoder of the first embodiment.

The operating section 5 includes, as shown in FIG. 11, a first selector 70, a first register 71, a second register 72, a multiplier 73, a barrel shifter 74, an adder 75, a first accumulator 76, a second accumulator 77, a second selector 78, a rounding and overflow correcting circuit 79, and a first inverter 80.

The value (S"+D) calculated by the adder means 38 in the sample RAM block 4 is transferred via the first selector 70 to the first register 71 and kept therein. At the same time, the scale factor of the subband and channel corresponding to the sample is read from the AS-RAM 14 shown in FIG. 2 such that coefficient C' is read from the coefficient ROM block 6 according to the factor value. Coefficient C' thus read from the block 6 is transferred to be kept in the second register 72 of the operating section 5.

As shown in FIG. 11, the coefficient ROM block 6 includes a plurality of coefficient ROMs 81 to 83 to store therein various coefficients, a first code inverter 84, and a second address generator 85. In this configuration, according to the designated allocation and scale factor, a read address is specified by the second address generator 85, and then a predetermined coefficient is read from the coefficient storage at the specified address such that the code of the obtained coefficient is inverted by the first code inverter 84, thereby outputting the resultant code from the inverter 84.

In this regard, among the plural coefficient ROMs 81 to 83, the C' coefficient ROM 81 is used to store therein the values of coefficient C' of expression (11). Additionally, the D coefficient ROM 82 is loaded with the values of window coefficient Di to be used in the generation of PCM data. Moreover, the Nik coefficient ROM 84 is provided to store therein the values of coefficient Nik related to the cosine function to obtain the V vector.

Subsequently, the addition result (S"+D) kept in the first register 71 is multiplied by coefficient C' held in the second register 72 by the multiplier 73. Next, the result of multiplication $\{C' \times (S"+D)\}$ from the multiplier 73 is fed to the barrel shifter 74 to be shifted corresponding to $2^{-m}$.

FIGS. 12A to 12C show the total number of machine cycles necessary to accomplish the inverse quantization and inverse scaling operations through the pipeline process. In this connection, FIGS. 12A and 12B show the number of machine cycles used when the operations are executed according to expression (1) of the prior art, whereas FIG. 12C shows the number of machine cycles required when the process is achieved in accordance with expression (11) of the embodiment.

FIG. 12A shows a case in which the values respectively of the coefficient factor and coefficients C and D are stored in one coefficient ROM. In this situation, in the first machine cycle, there are first read therefrom value S" in which the MSB of the sample is inverted and coefficient D. Next, in the second machine cycle, coefficient C is read from the ROM. Moreover, sample S" and coefficient D obtained in the first machine cycle are added to each other.

Subsequently, in the third machine cycle, a coefficient factor is read from the ROM, and coefficient C read therefrom in the second machine cycle is multiplied by addition result (S"+D). Thereafter, in the fourth machine cycle, the coefficient factor obtained in the third machine cycle is multiplied by multiplication result $\{C \times (S"+D)\}$ to thereby attain subband sample data S. In the fourth machine cycle, since next sample S" and coefficient D are read from the ROM, subband sample data S can be obtained in three machine cycles in total.

FIG. 12B shows a case including two coefficient ROMs in which a first coefficient ROM is used to store therein coefficient D and a second coefficient ROM is disposed to store therein the coefficient factor and coefficient C. With provision of two coefficient ROMs, it is possible in the stage of the third machine cycle to read next sample S" and coefficient D from the ROM. Consequently, subband sample data S can be obtained in two machine cycles in total.

In contrast with the conventional examples above, according to FIG. 12C showing operation of the embodiment, sample S" is first read from the sample RAM 24 and coefficient C' from the C' coefficient ROM 81 in the first machine cycle. Furthermore, in the first machine cycle, the attained sample S" and coefficient D are added to each other by the adder means 38.

According to the embodiment described above, the read operation is accomplished twice to obtain one sample S". Namely, to acquire one sample S" from the sample RAM 24, there is achieved a complex process using the first and second latch means 32 and 33. Therefore, when viewed in association with the pipeline process, there can be afforded a sufficient period of time to conduct the addition S"+D while the operations of the latch means 32 and 33 are being executed and hence it is possible to conduct the adding process in one machine cycle.

Next, in the second machine cycle, coefficient C' attained in the first machine cycle is multiplied by addition result (S"+D) from the adder means 38 and the result of multiplication $\{C' \times (S"+D)\}$ is shifted corresponding to $2^{-m}$. Since the operation time of the shift operation is quite smaller than that of the multiplication, it is possible to conduct the multiplication and shift operation in the same machine cycle.

The read operation of the subsequent sample (S"+D) and coefficient C' is accomplished in the third machine cycle. This is because that the read process of the sample RAM 24 is conducted twice to read one sample therefrom as described above. Additionally, the multiplication of coefficient C' by sample (S"+D) and the $2^{-m}$ shift process are carried out in the fourth machine cycle.

As above, in accordance with the embodiment, taking only subband sample data S into consideration, two machine cycles are required for the operation thereof. However, the operating unit is used at an interval of one machine cycle. Therefore, using the free machine cycle, the final operation (to obtain the sum of products between V vector and window coefficient Di) is executed to calculate PCM data, which will be described later. Consequently, considering the operation in association with the pipeline process, the subband sample operation can be accomplished in one machine cycle, which considerably reduces the operation time.

Subband sample data S thus attained is then transferred via the data bus 10 to the V vector RAM block 7 and temporarily stored therein as shown in FIG. 1.

Figure 13:
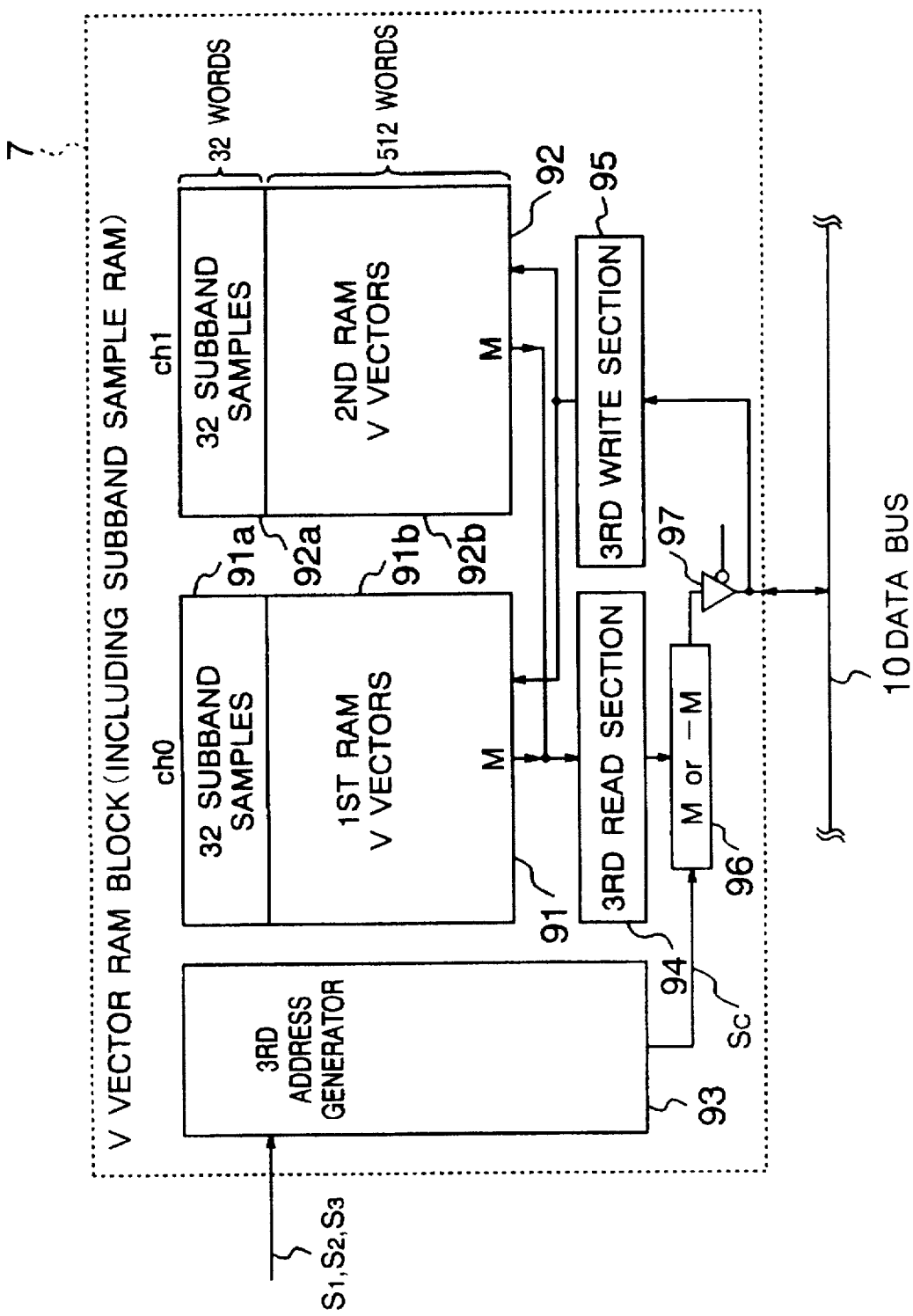
FIG. 13 is a block diagram showing the construction of a V vector RAM block in the decoder of the first embodiment.

The block 7 is configured as shown in FIG. 13. Namely, the block 7 includes a first RAM 91, a second RAM 92, a third address generator 93 as V vector read control means, a third read section 94 as V vector read means, a third write section 95, a second sign changer 96 as sign change means, and a second inverter 97.

The first RAM 91 is disposed to store therein subband sample data S and V vector for channel ch0, and the second RAM 92 is utilized to store therein subband sample data S and V vector for channel ch1.

In other words, the first and second RAM sections 91 and 92 respectively include subband sample RAM sections 91a and 92a to store therein 32-word subband sample data S corresponding to each subband and V vector RAM sections 91b and 92b to store therein 512-word V vectors obtained from the subband sample data S.

Each of the 32-word subband sample data items S provisionally stored in the subband sample RAM sections 91a and 92a respectively of the first and second RAMs 91 and 92 is again read therefrom to be fed to the operating section 5 shown in FIG. 11 so as to calculate the V vector.

Figure 27:
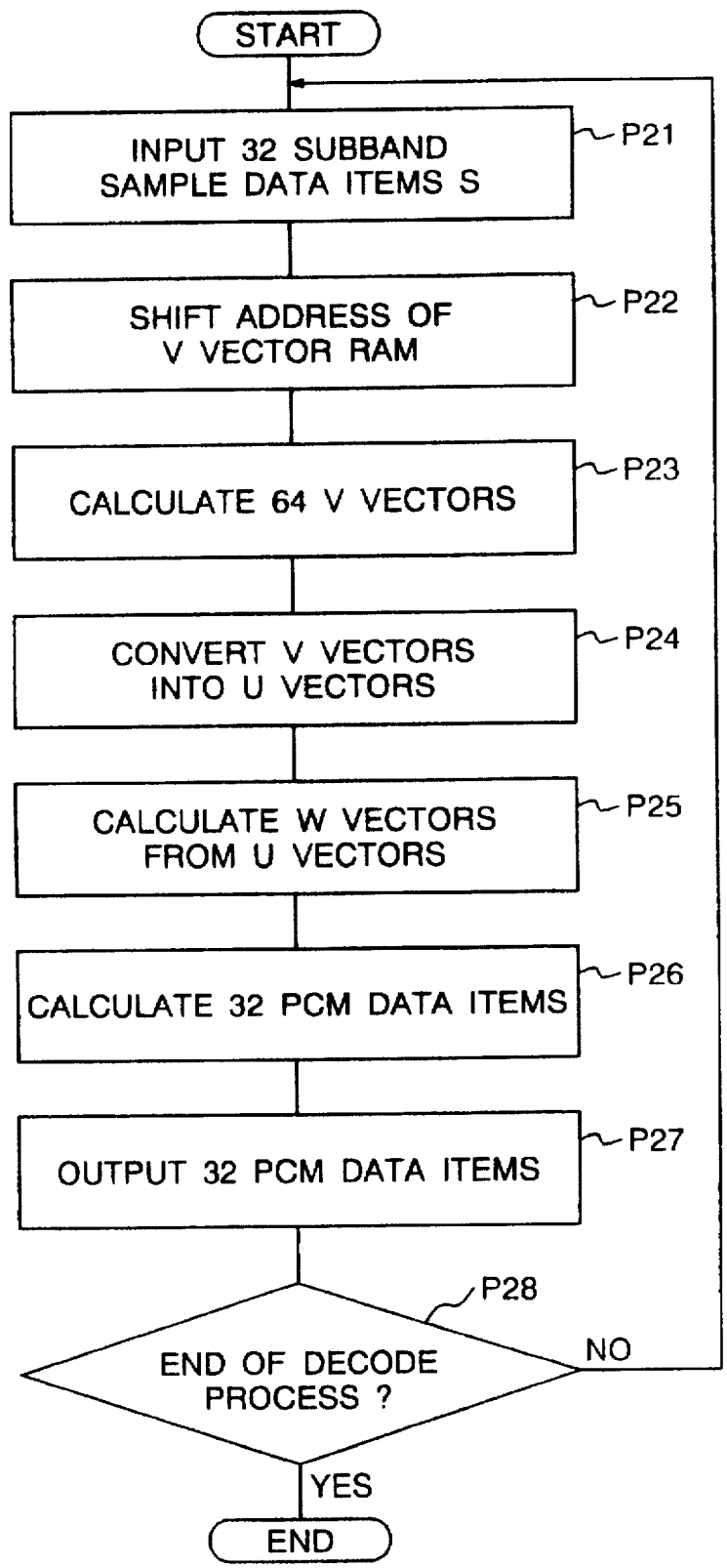
FIG. 27 is a flowchart showing a flow of the complex subband filtering process in the conventional decoder.

As shown in step 23 of FIG. 27, 64 V vectors are obtained from the 32 subband sample data items S in the conventional MPEG audio decoder. In contrast thereto, according to the embodiment, only 32 particular V vectors are attained by the operating section 5. This will be described in detail in the following paragraphs.

First, FIG. 14 shows the correlation of 64 V vectors.

As can be seen from FIG. 14, the values of the 17th to 32nd V vectors $V_{17}$ to $V_{32}$ are obtained by changing the sign of the values of codes of the 15th to 0th vectors $V_{15}$ to $V_0$, respectively. In addition, the values of the 49th to 63rd V vectors $V_{49}$ to $V_{63}$ are equal to those of the 47th to 33rd vectors $V_{47}$ to $V_{33}$, respectively.

Consequently, disposing a configuration in which the sign of each value of V vectors are appropriately inverted according to control signals supplied thereto, when V vectors $V_0$ to $V_{16}$ and $V_{33}$ to $V_{48}$ are obtained, all values of the V vectors $V_0$ to $V_{63}$ can be determined therefrom. Additionally, since it is known that the value of V vector $V_{16}$ is 0, the operation thereof can be dispensed with. As a result, the computation is required to achieve only for 32 words of V vectors including $V_0$ to $V_{15}$ and $V_{33}$ to $V_{48}$.

In the embodiment under the condition, 32 V vectors $V_0$ to $V_{15}$ and $V_{33}$ to $V_{48}$ are derived from 32 subband sample data items S according to expression (12).

$$Vi = \sum_{k=0}^{31} N_{ik} \times S_k \qquad (12)$$

$(i = 0\text{--}15, 33\text{--}48)$

The resultant 32 V vectors are transferred to the V vector RAM sections 91b and 92b respectively of the first and second RAMs 91 and 92 to be temporarily stored therein. The V vectors are then read therefrom to be fed to the operating section 5 so that a predetermined operation is achieved for the vectors by the section 5, thereby producing PCM data.

In the operation, the operating section 5 produces PCM data in a data-by-data manner according to the plural V vectors read from the V vector RAM sections 91b and 92b and window coefficient Di obtained from the coefficient ROM block 6.

Figure 16:
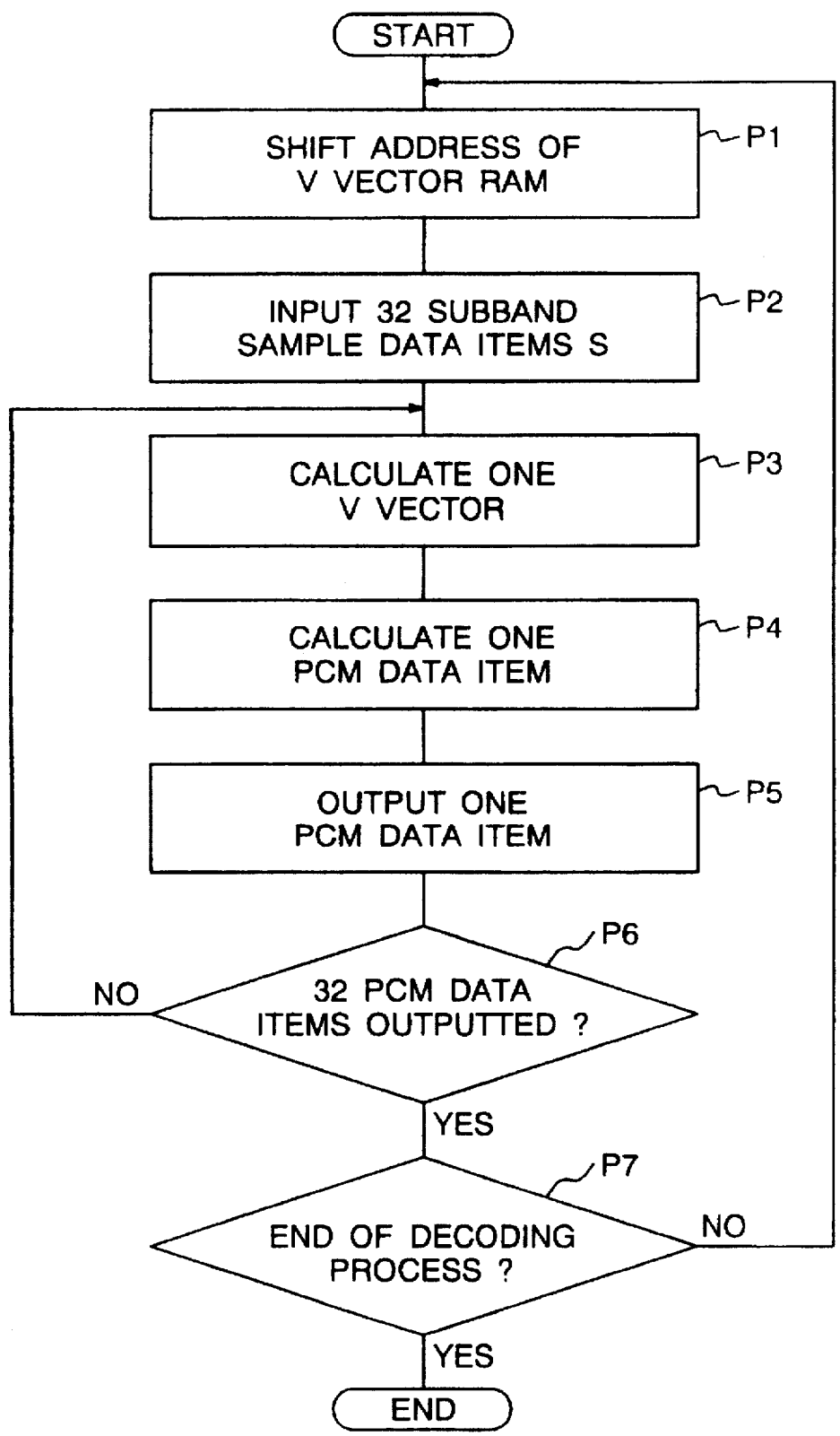
FIG. 16 is a flowchart showing a flow of the complex subband filtering process in the decoder of the first embodiment.

FIG. 16 is a flowchart showing the operation of complex subband filtering process to obtain the V vectors as above and to create PCM data therefrom. In this regard, description will be given of an example using V vectors and PCM data related to channel ch0.

Figure 17:
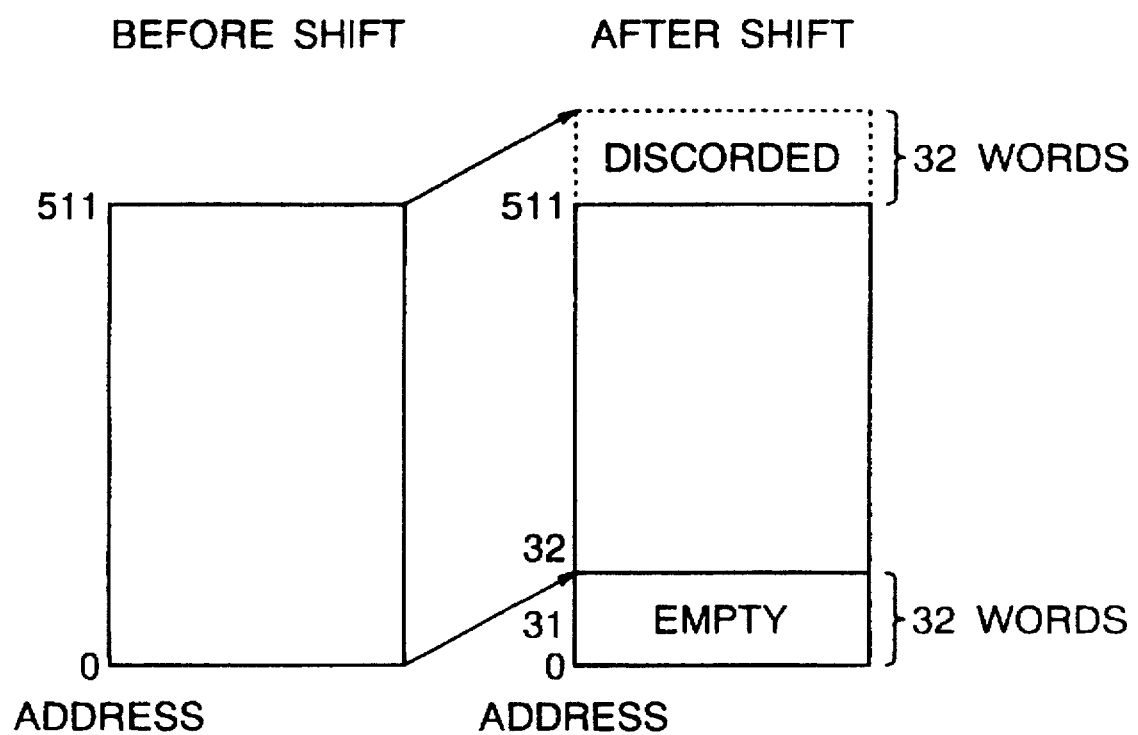
FIG. 17 is a diagram for explaining an address shift process in the V vector RAM block of the first embodiment.

In FIG. 16, the address of the V vector RAM section 91b is shifted 32 words in the first RAM 91 in the first step P1. Resultantly, the area ranging from address 0 to address 32 are set to the empty state in the V vector RAM section 91 to thereby reserve the area for V vectors calculated as shown in FIG. 17.

FIG. 15 shows a relationship between hardware addresses V'i for the V vector storage (corresponding to addresses for the group of 32 items in the V vector RAM section 91b) and V vectors Vi according to the MPEG standard. As can be seen from the relationship, stored in the addresses 0 to 31 of the V vector RAM section 91b are 32-word V vectors including $V_0$ to $V_{15}$ and $V_{33}$ to $V_{43}$ in this sequence.

Moreover, 32 subband sample data items S attained for each subband are inputted to the operating section 5 in step P2 as shown in FIG. 16. Next, according to data items S thus inputted, one V vector is calculated in step P3. The V vector attained as above is temporarily stored in a storage area (at either one of the addresses 0 to 32) thus reserved in the V vector RAM section 91b.

Subsequently, in step P4, the V vector attained in step P3 and the plural vectors which have already been calculated according to a plurality of groups of subband sample data items S inputted thereto in the past and which have already been stored in the V vector RAM section 91b at addresses 32 to 511 are read from the V vector RAM Section 91b. The read operation is accomplished by the third read section 94 under supervision of the third address generator 93. Thereafter, one PCM data is calculated according to the V vectors obtained therefrom.

In the V vector reading operation, the second sign changer 96 changes the sign of the V vector code read from the RAM section 91b according to control signal Sc supplied from the third address generator 93. That is, the third address generator 93 controls the address specification when the V vector is read from the RAM section 91b and supplies the second sign changer 96 with the control signal Sc indicating whether or not the sign of the obtained V vector is to be changed.

For example, on receiving a first usage request signal $S_1$ indicating that V vectors $V_0$ to $V_{15}$ or $V_{33}$ to $V_{48}$ stored in the RAM section 91b are to be used by the operating section 5, the third address generator 93 directly specifies addresses $V'_0$ to $V'_{31}$ shown in FIG. 15. In this situation, the generator 93 sends to the control signal Sc designating that the sign change is unnecessary to the second sign changer 96 as shown in FIG. 13.

Furthermore, on receiving a second usage request signal S2 indicating that V vectors $V_{17}$ to $V_{32}$ not stored in the RAM section 91b are to be used, since the values of V vectors $V_{17}$ to $V_{32}$ are respectively equal to those attained by change the sign of vectors $V_{15}$ to $V_0$ (reference is to be made to FIG. 14), the third address generator 93 specifies addresses $V'_{15}$ to $V'_0$ shown in FIG. 15. On this occasion, the generator 93 sends the control signal Sc designating that the code inversion is necessary to the second sign changer 96.

In addition, similarly, on receiving a third usage request signal $S_3$ indicating the use of V vectors $V_{49}$ to $V_{63}$ not stored in the RAM section 91b, since the values of V vectors $V_{49}$ to $V_{63}$ are respectively equal to vectors $V_{47}$ to $V_{33}$ (reference is to be made to FIG. 14), the third address generator 93 specifies addresses $V'_{30}$ to $V'_{16}$ shown in FIG. 15. In the operation, the generator 93 sends the control signal Sc designating unnecessariness of code inversion to the second sign changer 96.

Next, the PCM data attained in step P4 is transferred in the subsequent step P5 to the output interface section 8 to be outputted to an external device. In this regard, each time one PCM data item is produced from the operating section 5, the output interface section 8 may transform the PCM data into an analogue signal and then output the signal to the external device.

Subsequently, the contents of processes in steps P3 and P4 will be described in more detail. In the prior art, 32 PCM data items are obtained according to expression (7). In short, using a plurality of W vectors created from the V vectors, there are attained 32 PCM data items. In this connection, expression (7) can be expanded into the following expression.

$$\begin{aligned} PCM_0 &= W_0 + W_{32} + \ldots + W_{480} \\ PCM_1 &= W_1 + W_{33} + \ldots + W_{481} \\ &\vdots \\ PCM_{31} &= W_{31} + W_{63} + \ldots + W_{511} \end{aligned} \qquad (13)$$

Moreover, using relationships of expressions (4) to (6), expression (13) can be transformed into expression (14) as follows. In the embodiment, PCM data is attained according to expression (14).

$$PCM_0 = D_0 \times V_0 + D_{32} \times V_{96} + \ldots + D_{480} \times V_{992}$$
$$PCM_1 = D_1 \times V_1 + D_{33} \times V_{97} + \ldots + D_{481} \times V_{993}$$
$$\vdots$$
$$PCM_{31} = D_{31} \times V_{31} + D_{63} \times V_{127} + \ldots + D_{511} \times V_{1023}$$

(14)

Namely, as can be seen from expression (14), V vectors employed to attain, for example, PCM data $PCM_0$ are $V_0$, $V_{96}$, ..., and $V_{992}$. In the expression, V vector $V_0$ is calculated in step P3 to be stored in the V vector RAM section 91b at address 0.

In addition, V vectors $V_{96}$ to $V_{992}$ which have already been obtained according to the plural subband sample data items S inputted in the past and which have already been stored in the RAM section 91b at addresses 32 to 511. However, in actual, the values of V vectors $V_{96}$ to $V_{992}$ have not been necessarily obtained to be stored therein. Namely, it may also be possible that the values of either one of the sets of V vectors are obtained to be stored therein according to the correlation shown in FIG. 14.

Consequently, in the computation of PCM data $PCM_0$, it is only necessary that only one V vector, i.e., V0 is obtained and the remaining vectors $V_{96}$ to $V_{992}$ are read from the RAM section 91b by appropriately changing the sign thereof by the second sign changer 96.

In this situation, when V vector $V_0$ is calculated by the operating section 5, the third address generator 93 of FIG. 13 controls the third read section 94 to read V vectors $V_0$, $V_{96}$, ..., and $V_{992}$ from the RAM section 91b. This also applies to the other PCM data items $PCM_1$ to $PCM_{31}$.

Incidentally, in the description above, when V vector $V_0$ is calculated by the operating section 5, V vectors $V_0$, $V_{96}$, ..., and $V_{992}$ are read from the RAM section 91b. However, it may also be possible to utilize V vector $V_0$ obtained by the operating section 5.

Subsequently, in step P6 shown in FIG. 16, a check is made to decide whether or not 32 PCM data items $PCM_0$ to $PCM_{31}$ have completely been outputted to the external device. When there remains any PCM data to be supplied thereto, control is returned to step P3 to generate the subsequent PCM data. On the other hand, if the output of 32 PCM data items has been finished, control proceeds to step P7 to decide whether or not the decoding process is to be terminated. When the process is to be further achieved, control is passed to the process of step P1 to initiate the decoding process for the succeeding 32 PCM data items.

As above, according to the embodiment, from 64 V vectors created from a set of subband sample data items S, it is only necessary to select 32 V vectors $V_0$ to $V_{15}$ and $V_{33}$ to $V_{48}$ so as to store these vectors in the respective V vector RAM sections 91b and 92b, thereby completely obtaining the values of 64 V vectors $V_0$ to $V_{63}$ in the data reading operation.

Consequently, when compared with the conventional MPEG audio decoder in which 64 V vectors are respectively calculated to be stored in the V vector RAM, the present embodiment reduces the quantity of V vector data to be stored in the RAM to half that of the prior art and hence the memory capacity of each of the V vector RAM sections 91b and 92b can be reduced to half that required in the conventional system. That is, the prior art requires the memory capacity of 1024 words, whereas the necessary memory capacity is only 512 words in the embodiment.

Incidentally, since the embodiment includes the second sign changer 96 shown in FIG. 13, it is possible to obtain only the values of either one of the sets of V vectors mutually having different signs so as to store the values in the V vector RAM sections 91b and 92b. However, it is not necessarily required to provide the second sign changer 96.

When the second sign changer 96 is omitted as above, for the the remaining one of the sets of V vectors having equal values, it is unnecessary to calculate the values to be stored in the vector RAM sections 91b and 92b. When compared with the prior art, this configuration also makes it possible to minimize the storage capacity of the vector RAM sections 91b and 92b.

Additionally, as can be seen from expression (12), the V vectors are calculated through multiplications and additions. However, as already known, the multiplication is attended with a heavy operation load. Consequently, according to the present embodiment, since the quantity of V vector is reduced in the computation to half that of the conventional system, there is attained an advantage that the operation load is reduced and the processing speed is increased.

Moreover, the PCM data items are generated in the item-by-item fashion in this embodiment to accomplish the sequence of process operations in a pipeline process such that while one PCM data item is being outputted to an external device, the subsequent PCM data item is created. Furthermore, the creation process of one PCM data item and the output process thereof require the same number of machine cycles.

Consequently, according to the embodiment, the PCM data items are produced in the item-by-item fashion without creating any W vector from a plurality of V vectors such that the previously produced PCM data item is sent to an external device while the succeeding PCM data item is being produced so as to continuously output the PCM data items.

As a result, the PCM data (audio data) items can be successively sent to the external device without using the memory to output therefrom PCM data therefrom and the memory to keep therein data for the creation of PCM data items.

Figure 18:
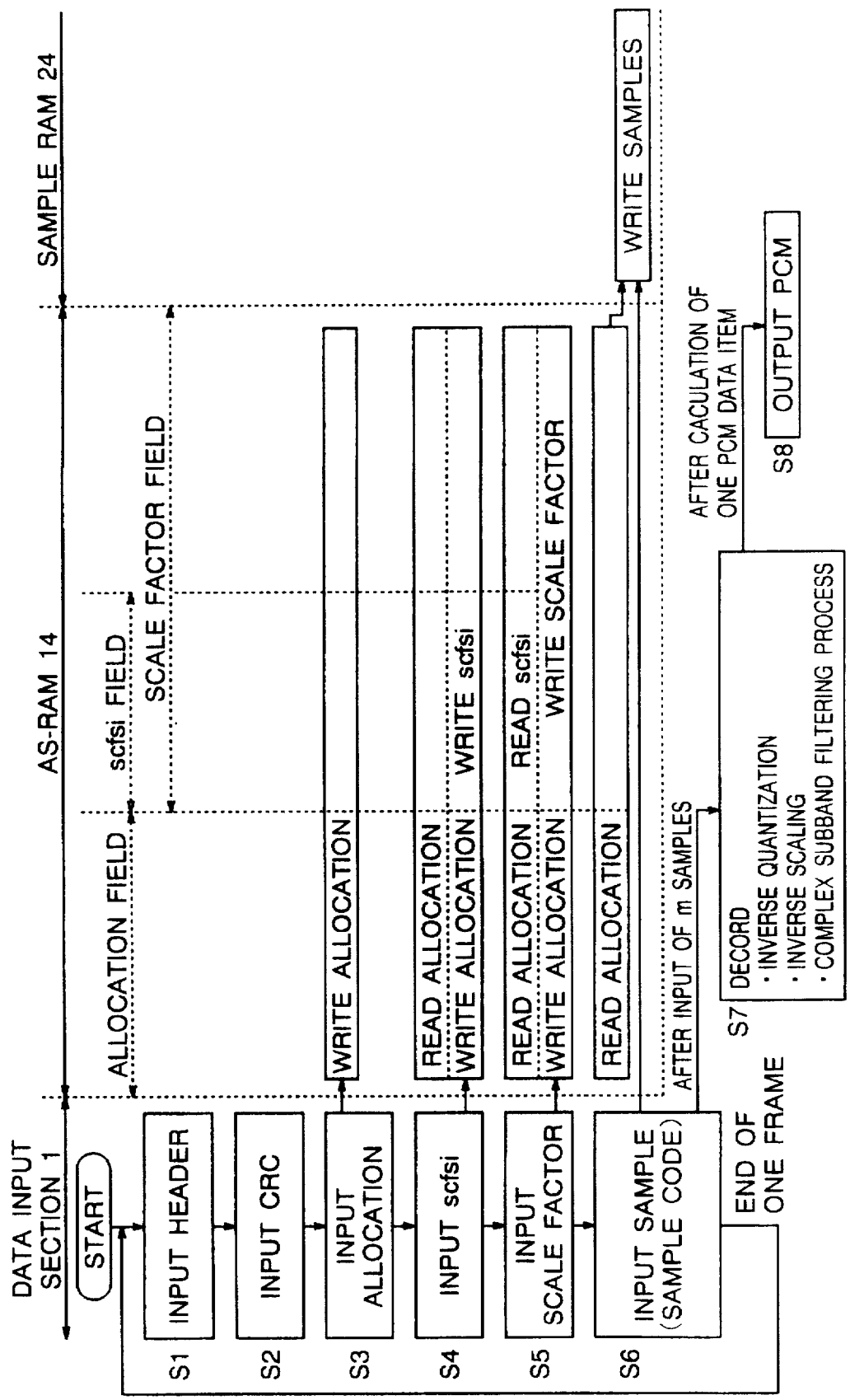
FIG. 18 is a diagram showing a flow of the series of decode operations in the decoder of the first embodiment.

FIG. 18 schematically shows a flow including a sequence of data process operations in the embodiment of the MPEG audio decoder described above. In addition, for the easy understanding of the feature of the data process flow of the embodiment, a comparative example of the data process flow of the conventional MPEG audio decoder will be shown in FIG. 19.

Figure 19:
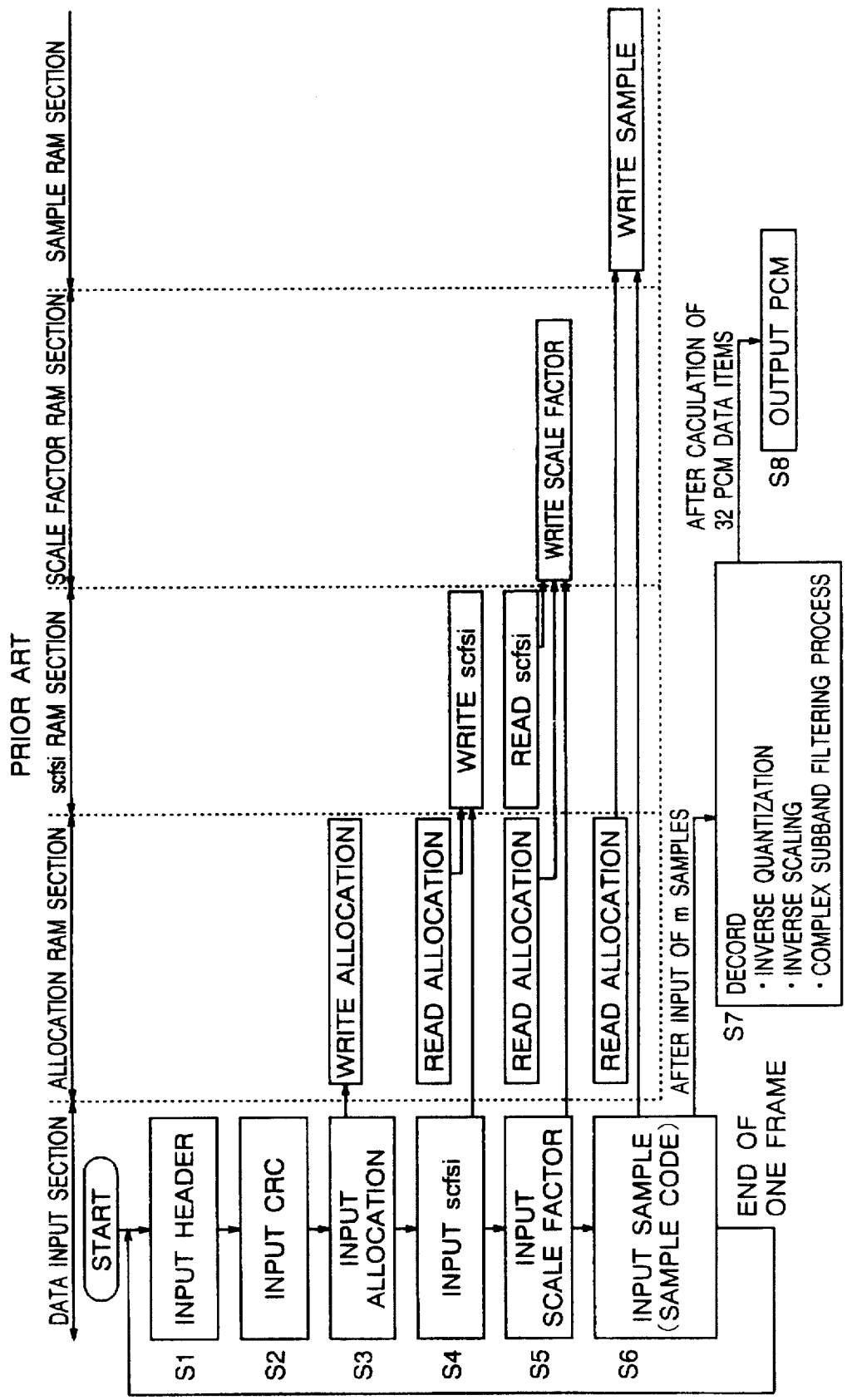
FIG. 19 is a diagram showing a flow of the series of decode operations in a conventional decoder.

As can be seen from FIG. 19, for the storage of the allocation, scfsi, scale factor, and sample, there are conventionally disposed buffer memories (RAMs) respectively dedicated thereto. In the configuration, the respective information items are stored in the associated buffer memories. Additionally, in the decoding process, after 32 PCM data items are calculated, these items are outputted therefrom in the item-by-item manner.

In contrast thereto, according to the embodiment shown in FIG. 18, one AS-RAM is subdivided into an allocation field, an scfsi field, and a scale factor field (a portion thereof overlaps with the scfsi field). Once scfsi is read therefrom, a scale factor inputted thereafter is written in the pertinent area of the field.

Additionally, in the decoding process, the PCM data items are sequentially generated in the item-by-item way such that when one PCM data item is created, the item is then immediately outputted therefrom, thereby sequentially outputting the PCM data items therefrom.

Consequently, according to the embodiment, since a portion of the overall storage area of the AS-RAM is shared between a memory area to provisionally store the scfsi and a memory to temporarily store a portion of the scale factor, it is unnecessary to prepare any buffer memory exclusively used for the scfsi. In addition, the audio data can be successively outputted to an external device without using any memory to store data for the production of PCM.

Moreover, although not seen from FIG. 18, the storage capacity of the sample RAM 24 and the capacity of each the V vector RAM sections 91b and 92b used in the complex subband filtering process can be minimized when compared with those of the prior art as already described by referring to the drawings.

As above, in the embodiment of the MPEG audio decoder, the capacity of each of the various buffer memories arranged therein can be minimized. In total, the storage capacity of the internal memory can be considerably reduced when compared with that of the conventional system.

Furthermore, using the following calculation steps, a comparison will be made between the prior art and the present invention for the machine cycles necessary to obtain 32 PCM data items in the operating section 5.

| Prior art | |
|---|---|
| 32 subband samples | 32 × 2 = 64 cycles |
| 64 V vectors | 64 × 32 = 2048 cycles |
| 32 PCM data items | 32 × 16 = 512 cycles |
| | Total 2624 cycles |

| Present invention | |
|---|---|
| 32 subband samples | 32 × 1 = 32 cycles |
| 64 V vectors (32 V vectors) | 32 × 32 = 1024 cycles |
| 32 PCM data items | 32 × 16 = 512 cycles |
| | Total 1568 cycles |

In the comparative description above, the process according to the conventional technology is executed as shown in FIG. 12B, whereas the process of the present embodiment is accomplished as shown in FIG. 12C. Furthermore, these calculations are carried out for the comparison by an apparatus capable of achieving the operation of sum of products in one machine cycle.

As can be seen from the calculations, according to the embodiment of the MPEG audio decoder, the number of machine cycles necessary to create 32 PCM data items can be reduced to about 40% that of the prior art. Consequently, the sequence of decode process operations can be conducted at a high speed.

As above, the embodiment includes the scfsi/scale factor write means to access the AS-RAM in which at least the scfsi and scale factor are provisionally stored such that in a predetermined storage area of the AS-RAM in which the scfsi is already written, the write means writes the scale factor with a portion thereof overlapped with the area of scfsi. Namely, a portion of the storage of the AS-RAM is shared between a storage area in which the scfsi is temporarily stored and a storage area in which a portion of the scale factor is provisionally stored. As a result, it is unnecessary to dispose a buffer memory dedicated to the scfsi and hence the storage capacity of the memory to temporarily store therein information items existing in the audio compression data can be minimized by an amount of storage capacity equivalent to that of the storage area saved in association with the scfsi.

Additionally, since there are arranged the sample write means to sequentially write a plurality of samples in the storage area of the sample RAM in the mis-align state and the sample read means to sequentially read in the sample-by-sample fashion the plural samples stored in the sample RAM in the mis-align state, it is possible to store a plurality of samples in an area thereof at one address. In consequence, in the overall storage area of the sample RAM, the unused areas in which samples are not written can be removed and it is unnecessary to prepare as many addresses as there are samples to be stored, thereby possibly minimizing the storage capacity of the sample RAM.

Furthermore, of the plural V vectors generated from the subband sample data, one of the sets of V vectors having a correlation therebetween is selected to calculate the values of the V vectors of the selected set, thereby storing the values in the V vector RAM. When V vectors are requested and are missing in the V vector RAM, the V vectors having the correlation are read from the RAM. If the obtained V vectors have the same values as those of the requested V vectors due to the correlation, the V vectors are directly outputted to the pertinent section. If the values of the obtained V vectors are different from those of the requested V vectors in the sign, the sign of the obtained V vectors is changed by the sign changing means so as to output the resultant vectors to the section. Therefore, to cope with the utilization request of all V vectors, it is unnecessary to calculate the values of V vectors in one of the sets of V vectors mutually having the same values and one of the V vectors different from each other only in the sign so as to store the calculated values in the V vector RAM. Namely, the quantity of data of the V vectors to be stored for all of the plural V vectors produced from a set of subband sample data items can be further decreased and hence the required storage capacity is much more minimized. In addition, it is possible to minimize the period of time required to obtain the V vectors in the complex subband filtering process.

Furthermore, using one V vector obtained from the operating means, a plurality of V vectors which are necessary to create one PCM data item and which are beforehand attained according to a set of subband sample data items inputted before the current set of subband sample data items to be stored in the V vector RAM at different addresses, and a predetermined inverse quantization coefficient, there are conducted multiplications and additions to produce one PCM data item. Moreover, the produced PCM data is then outputted to an external device. Consequently, the audio data items can be successively sent to the external device without using the memory to output PCM data items and the memory to keep data for the production of the PCM data items. Therefore, the capacity of the memory required to continuously output audio data items to the external device can be possibly reduced.

According to the embodiment described above, the storage capacity of each of the buffer memories arranged in the decoder to temporarily store therein various information items produced in the sequence of decode process operations can be reduced; or, some memories may be dispensed with. In consequence, the entire storage capacity of the memories in the MPEG audio decoder can be remarkably minimized as compared with the prior art.

Moreover, in the embodiment described above, the inverse quantization and inverse scaling processes are achieved by one multiplication and addition operation and one shift operation according to a computation formula in which the exponent of the operation value indicated by the value of the scale factor in the audio compression data is separated into a fraction part and an integer part. Consequently, one of the two multiplication operations conducted in the prior art can be replaced with a shift operation to thereby remarkably minimize the operation load.

In addition, there is provided the adder means to add a sample by acquiring through a latch process to a predetermined inverse quantization coefficient so that while a sample is being thus acquired, a sample previously obtained can be added to the coefficient. Therefore, the sample acquisition process and adding process can be carried out in one machine cycle.

Furthermore, when the inverse quantization and inverse scaling processes are effected in a pipeline process, the process to obtain the sample and to add the inverse quantization coefficient to the sample and the multiplication and shift processes using information attained through the sample acquiring and adding processes in the previous cycle can be completely conducted in one machine cycle, which reduces the process time required to achieve the inverse quantization and inverse scaling processes.

According to the embodiment described above, the process time necessary to execute the inverse quantization and inverse scaling processes and that required thereafter for the complex subband filtering process and V vector attaining process can be decreased. Consequently, the sequence of decode process operations can be accomplished at considerably a higher speed as compared with the conventional technology.

Figure 20:
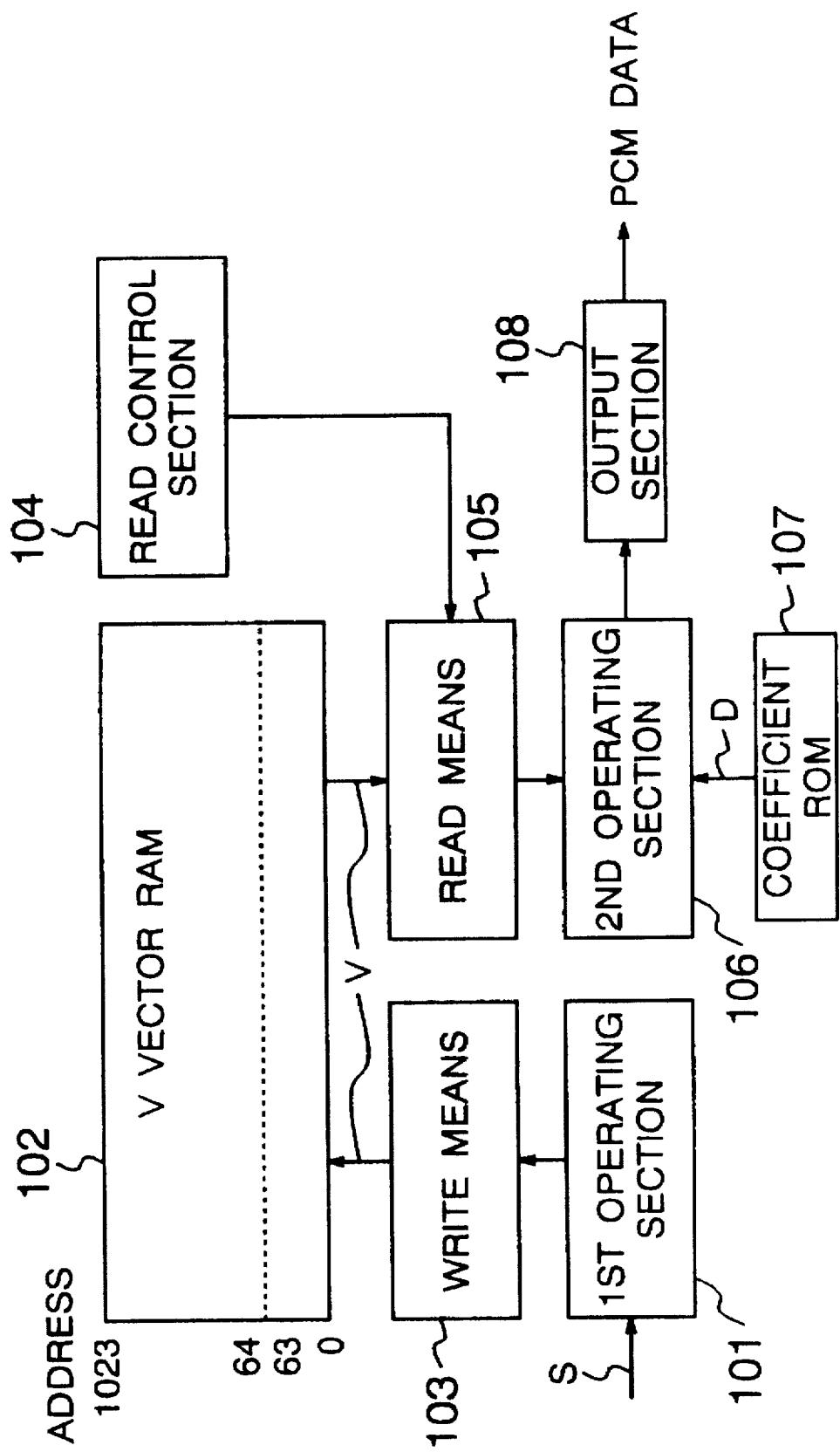
FIG. 20 is a block diagram showing the main configuration of a decoder in a second embodiment according to the present invention.

Subsequently, description will be given of a second embodiment of the MPEG audio decoder according to the present invention by referring to the drawings. FIG 20 shows in a block diagram the configuration of the main section of the decoder according to the present invention.

In FIG. 20, numeral 101 indicates a first operating section to calculate V vectors in a vector-by-vector fashion according to 32 subband sample data items S supplied thereto. Numeral 102 stands for a V vector RAM to store therein V vectors attained from the first operating section 101. The storing of the V vectors is achieved by write means 103.

In this connection, to obtain 32 PCM data items in conformity with layers I and II of the MPEG1 audio standard, the calculation is sequentially conducted in the unit of 64 items according to different sets of subband sample data items S (a set includes 32 data items). In the operation, the V vectors have the correlation shown in FIG. 14.

As can be seen from FIG. 14, there exist the following relationships between the V vectors.

V vectors $V_{17}$ to $V_{32}$=−(V vectors $V_{15}$ to $V_0$)

V vectors $V_{49}$ to $V_{63}$=−(V vectors $V_{47}$ to $V_{33}$)

Consequently, in a case in which the V vectors are stored in the V vector RAM 2 according to a relationship shown in FIG. 15, when it is desired to attain, for example, PCM data items $PCM_0$ to $PCM_{31}$ from expression (14), there are required V vectors $V_0$ to $V_{31}$. To attain PCM data items $PCM_0$ to $PCM_{15}$, there are obtained V vectors $V_0$ to $V_{15}$; whereas, to obtain PCM data items $PCM_{16}$ to $PCM_{31}$, there are acquired V vectors $V_{33}$ to $V_{48}$.

In this connection, although V vectors $V_{33}$ to $V_{48}$ are required to obtain PCM data items $PCM_{16}$ to $PCM_{31}$, since PCM data items $PCM_0$ to $PCM_{15}$ have already been computed and stored in the storage, it is only necessary to read therefrom V vectors $V_{15}$ to $V_1$ for the process (V vector $V_{16}$ is necessary to attain PCM data $PCM_{16}$, however, V vector $V_{16}$ is 0 and hence is associated with 0).

Numeral 104 denotes a read control section for supervising read means 105 to read from the v vector RAM 102 one V vector obtained from the first operating section 101 (stored at addresses 0 to 63) and a plurality of V vectors which have already been calculated according to a plurality of subband sample data items S inputted in the past and which have already been stored in the V vector RAM 102 (at addresses 64 to 1023).

Numeral 106 is a second operating section to create PCM data items in a item-by-item manner according to the plural V vectors read from the storage under supervision of the read control section 104 and the window coefficient D read from a coefficient ROM 107. Numeral 108 designates an output section to output, each time one PCM data item is obtained from the second operating section 106, the items to an external device.

Referring next to a flowchart of FIG. 21, description will be given of operation of the second embodiment of the decoder constructed as above.

Figure 21:
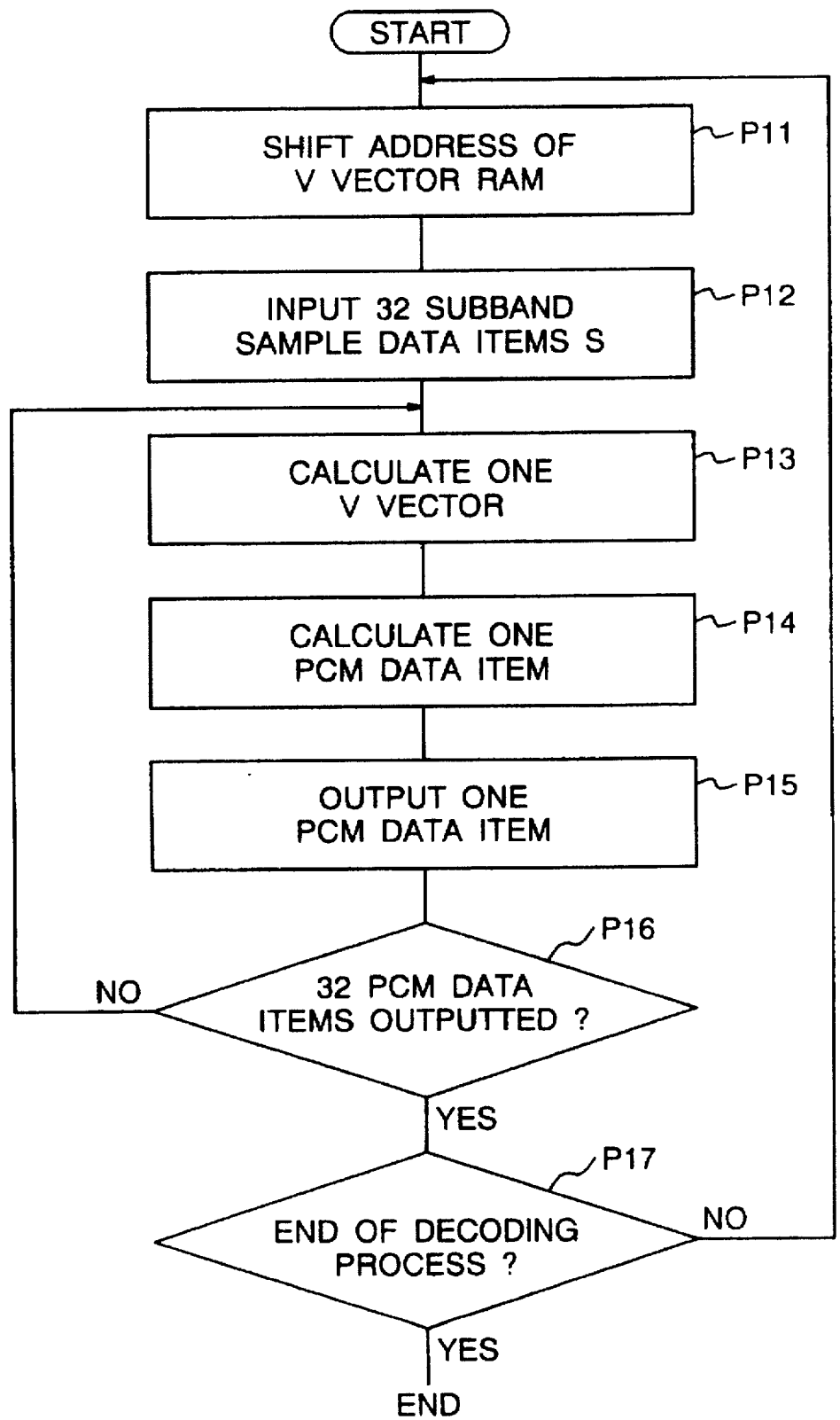
FIG. 21 is a flowchart showing the contents of operation of the decoder in the second embodiment.
Figure 28:
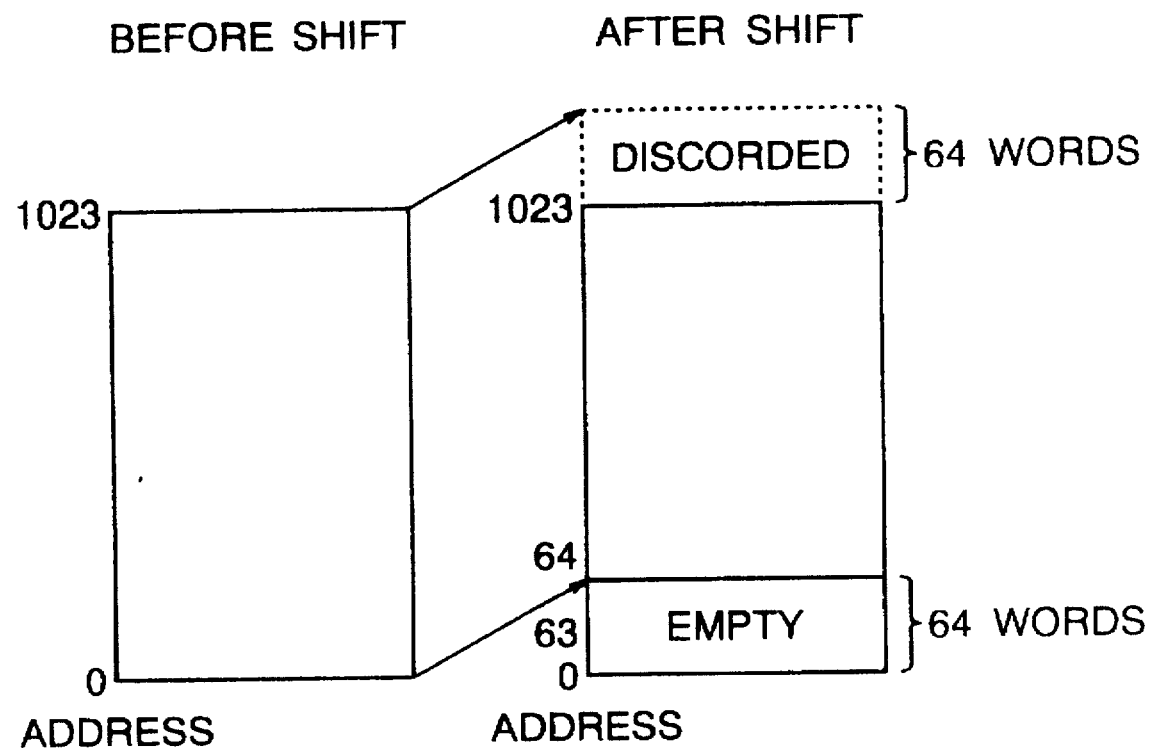
FIG. 28 is a diagram for explaining the address shift process in the conventional decoder.

In FIG. 21, the addresses of the V vector RAM 102 are shifted by 64 words in the first step P11. As a result the area ranging from address 0 to address 63 is set to the empty state in the RAM 102, the area being reserved as an area to store therein V vectors to be calculated thereafter as shown in FIG. 28.

In step P12, 32 subband sample data items Si (i=0 to 31) obtained for each subband are then supplied to an internal memory, not shown. Subsequently, in step P13, one V vector is calculated from 32 subband sample data items S inputted in step P12. The V vector thus obtained is temporarily stored in a storage area reserved therefor in the V vector RAM 102 (at either one of the addresses 0 to 63).

In the succeeding step P14, one PCM data item is calculated using the V vector obtained in step P13 and a plurality of V vectors which have already been obtained from a plurality of sets of subband sample data items S inputted in the past and which have already been stored in the V vector RAM 102 at addresses 64 to 1023. The PCM data item thus attained is outputted to an external device in the next step P15.

Subsequently, the contents of the processes of steps P13 and P14 will be described in detail. Conventionally, 32 PCM data items are computed according to expression (7). That is, using a plurality of W vectors generated from V vectors, there are obtained 32 PCM data items. In this connection, expression (7) can be expanded to expression (13).

Using the relationships of expressions (4) to (6), expression (13) can be transformed into expression (14). In this embodiment, PCM data items are calculated according to expression (14).

In short, as can be seen from expression (14), to obtain, for example, PCM data $PCM_0$, there are used V vectors $V_0$, $V_{96}$, ..., and $V_{992}$. In these vectors, V vector $V_0$ is obtained in step P3 and is stored in the V vector RAM 2 at address 0. Additionally, V vectors $V_{96}$ to $V_{992}$ have already been calculated according to the plural sets of subband sample data items inputted in the past and have already been stored in the V vector RAM 2 at addresses 64 to 1023.

Consequently, to attain PCM data $PCM_0$, it is only necessary to obtain one V vector V0 and then the remaining vectors V vectors $V_{96}$ to $V_{992}$ are to be read from the V vector RAM 2. In this situation, when V vector $V_0$ is calculated by the first operating section 101, the read control section 104 of FIG. 20 supervises the read means 105 to read V vectors $V_0$ and $V_{96}$ to $V_{992}$ from the V vector RAM 102. This also applies to the other PCM data items $PCM_1$ to $PCM_{31}$.

In this regard, in the description above, when V vector $V_0$ is calculated by the first operating section 101, V vectors $V_0$, $V_{96}$, ..., and $V_{992}$ are read from the V vector RAM 102. However, V vector $V_0$ attained by the first operating section 101 may be employed in the process.

In the subsequent step P16, a check is made to decide whether or not 32 PCM data items $PCM_0$ to $PCM_{31}$ have been completely outputted. If there remains any PCM data item to be outputted, control is returned to step P13 to generate the next PCM data item. On the other hand, the 32 PCM data items have been outputted, control proceeds to step P17 to decide whether or not the decoding process is to be terminated. If the process is to be continuously executed, control is passed to step P11 to initiate the process for the subsequent frame.

In this embodiment, the sequence of above processes to generate and to output PCM data items in the item-by-item fashion are executed in a pipeline process so that the succeeding PCM data item is created while the preceding PCM data item is being outputted to an external device. Furthermore, the number of machine cycles required for the process to generate one PCM data item is equal to that necessary for the data item output process.

Therefore, according to the embodiment of the MPEG audio decoder, without generating W vectors from plural V vectors, there are produced PCM data items in the item-by-item manner so that the previously produced PCM data item is outputted to an external device while the succeeding PCM data item is being generated, thereby successively outputting the PCM data items thereto.

As a result, the PCM data (audio data) items can be continuously outputted to the external device without using the memory to output PCM data and the memory to keep therein data for the production of PCM data items.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A decoder for decoding compression data attained by conducting a compression encoding operation for digital data through a high efficiency encoding in which the data compression is conducted such that one sample is subdivided according to a frequency of a signal represented by the digital data into a set of subband samples representing frequency components of a plurality of subbands and there are extracted from each of the subband samples first information data having a variable bit length and indicating a level of the subband sample logarithmically compressed, second information data representing a factor of the logarithmic compression, third information data denoting the number of the second information items associated with a predetermined data length, and fourth information data representing at least a bit length of the first information data, said decoder comprising:

first storage means for provisionally storing therein at least the second information data and the fourth information data;

first write means for writing at least the second information data and the fourth information data in a predetermined storage area of the first storage means according to the third information data;

first read means for reading at least the second information data and the fourth information data from the predetermined storage area of the first storage means;

second storage means for temporarily storing therein the first information data;

second write means for writing the first information data in the second storage means according to the fourth information data;

second read means for reading the first information data from the second storage means;

operating means for conducting an inverse quantization process obtaining a bit length of each sample data from the first information data according to the fourth information data, executing an inverse scaling process attaining subband sample data indicating a level of the subband sample from each sample data through an exponent operation specified by the second information data, carrying out a complex subband filtering process combining the subband sample data related to the set of subband samples into a sequence of numeric values associated with the original digital data, and thereby obtaining the original digital data from the sequence of numeric values;

said operating means further producing an operation formula by subdividing an exponent of the exponent operation into an integer part and a fraction part and conducting through a multiplication an operation related to the fraction part according to the operation formula, conducting through a shift operation an operation related to the integer part, thereby attaining the subband sample data;

said operating means calculating the sequence of numeric values on the basis of the subband sample data associated with the set of subband samples;

third storage means for temporarily storing therein the sequence of numeric values calculated by the operating means;

third write means for writing the sequence of numeric values in a predetermined area of the third storage means;

third read means for reading the sequence of numeric values from the third storage means; and output means for outputting therefrom digital data obtained by the operation means; and wherein said first write means temporarily writes, after storing the third information data in the predetermined storage area of the first storage means, the second information data inputted after the third information in the storage area in which the third information is previously stored.

2. A decoder according to claim 1, wherein:

the compression data is audio compression data conforming to moving picture experts group (MPEG) standards;

the first information data is sample data;

the second information data is scale factor data;

the third information data is scale factor selection information (scfsi) data;

the fourth information data is allocation data; and the sequence of numeric values are V vectors.

3. A decoder for decoding compression data attained by conducting a compression encoding operation for digital data through a high efficiency encoding in which the data compression is conducted such that one sample is subdivided according to a frequency of a signal represented by the digital data into a set of subband samples representing frequency components of a plurality of subbands and there are extracted from each of the subband samples first information data having a variable bit length and indicating a level of the subband sample logarithmically compressed, second information data representing a factor of the logarithmic compression, third information data denoting the number of the second information items associated with a predetermined data length, and fourth information data representing at least a bit length of the first information data, said decoder comprising:

first storage means for provisionally storing therein at least the second information data and the fourth information data;

first write means for writing at least the second information data and the fourth information data in a predetermined storage area of the first storage means according to the third information data;

first read means for reading at least the second information data and the fourth information data from the predetermined storage area of the first storage means;

second storage means for temporarily storing therein the first information data;

second write means for writing the first information data in the second storage means according to the fourth information data;

second read means for reading the first information data from the second storage means;

operating means for conducting an inverse quantization process obtaining a bit length of each sample data from the first information data according to the fourth information data, executing an inverse scaling process attaining subband sample data indicating a level of the subband sample from each sample data through an exponent operation specified by the second information data, carrying out a complex subband filtering process combining the subband sample data related to the set of subband samples into a sequence of numeric values associated with the original digital data, and thereby obtaining the original digital data from the sequence of numeric values;

said operating means further producing an operation formula by subdividing an exponent of the exponent operation into an integer part and a fraction part and conducting through a multiplication an operation related to the fraction part according to the operation formula, conducting through a shift operation an operation related to the integer part, thereby attaining the subband sample data;

said operating means calculating the sequence of numeric values on the basis of the subband sample data associated with the set of subband samples;

third storage means for temporarily storing therein the sequence of numeric values calculated by the operating means;

third write means for writing the sequence of numeric values in a predetermined area of the third storage means;

third read means for reading the sequence of numeric values from the third storage means; and output means for outputting therefrom digital data obtained by the operation means; and wherein:

the second write means writes the first information in the second storage means according to the fourth information in a state in which the write operation is not necessarily aligned with address boundaries of the second storage means; and the second read means reads the first information from the second storage means in an information-by-information manner, the first information being written in the second storage means according to the fourth information in a state in which the write operation is not necessarily aligned with address boundaries of the second storage means.

4. A decoder according to claim 3, wherein the second read means includes:

sample specifying means for specifying a position of one first information data item to be read from the second storage means;

first latch means for sequentially keeping therein data from the second storage means at an address associated with the position specified by the sample specifying means;

second latch means for sequentially keeping therein data outputted from the first latch means;

decision means for deciding that one first information data item to be read from the second storage means is stored in an area thereof indicated by one address or in an area indicated by two addresses;

first acquiring means for acquiring, when the decision means decides that the first information data item is in an area indicated by one address, the first information data as the read object from data kept in the second latch means; and second acquiring means for acquiring, when the decision means decides that the first information data item is in an area indicated by two addresses, the first information data as the read object from data items respectively kept in the first and second latch means.

5. A decoder according to claim 4, wherein:

the first acquiring means shifts the data kept in the second latch means by a predetermined number of bits;

the first acquiring means aligning the first information data item as the read object to a first position of one word; and the first acquiring means setting all bits of one word other than those of the shifted first information data item to "0", thereby acquiring only the first information data item.

6. A decoder according to claim 5, wherein the first acquiring means determines the number of bits of the shift according to the first information data item as the read object in the second storage specified by the sample specifying means.

7. A decoder according to claim 4, wherein:

the second acquiring means shifts the data items respectively kept in the first and second latch means by a predetermined number of bits;

the second acquiring means aligning the first information data item as the read object thus kept in the first and second latch means in a separated fashion to a first position of one word;

the second acquiring means setting all bits of one word other than those of the shifted first information data item to "0", thereby acquiring only the first information data item.

8. A decoder according to claim 7, wherein the second acquiring means determines the number of bits of the shift according to the first information data item as the read object in the second storage specified by the sample specifying means.

9. A decoder according to claim 4, wherein the second read means further includes adder means for adding the first information data acquired by the first or second acquiring means to a predetermined inverse quantization coefficient.

10. A decoder according to claim 9, wherein the process of acquiring the first information data by the first and second acquiring means and the addition process by the adder means are conducted in a pipeline process.

11. A decoder according to claim 9, wherein the operating means includes:

operation formula generating means for separating an exponent of the exponent operation specified by a value of the second information data into an integer part and a fraction part and thereby generating operation formula for the inverse quantization and inverse scaling processes;

multiplication means for conducting an operation through a multiplication for a fraction part of a result of operation conducted by the adder means, the multiplication being executed according to the operation formula generated by the operation formula generating means; and shift means for accomplishing through a shift process an operation related to the integer part of the operation formula for a result of operation conducted by the multiplication means.

12. A decoder according to claim 11, wherein the result of the operation conducted for the fraction part by the multiplication means is beforehand stored as table information in a read-only memory (ROM).

13. A decoder according to claim 12, wherein the inverse quantization and inverse scaling processes associated with the operation formula are carried out in a pipeline process.

14. A decoder for decoding compression data attained by conducting a compression encoding operation for digital data through a high efficiency encoding in which the data compression is conducted such that one sample is subdivided according to a frequency of a signal represented by the digital data into a set of subband samples representing frequency components of a plurality of subbands and there are extracted from each of the subband samples first information data having a variable bit length and indicating a level of the subband sample logarithmically compressed, second information data representing a factor of the logarithmic compression, third information data denoting the number of the second information items associated with a predetermined data length, and fourth information data representing at least a bit length of the first information data, said decoder comprising:

first storage means for provisionally storing therein at least the second information data and the fourth information data;

first write means for writing at least the second information data and the fourth information data in a predetermined storage area of the first storage means according to the third information data;

first read means for reading at least the second information data and the fourth information data from the predetermined storage area of the first storage means;

second storage means for temporarily storing therein the first information data;

second write means for writing the first information data in the second storage means according to the fourth information data;

second read means for reading the first information data from the second storage means;

operating means for conducting an inverse quantization process obtaining a bit length of each sample data from the first information data according to the fourth information data, executing an inverse scaling process attaining subband sample data indicating a level of the subband sample from each sample data through an exponent operation specified by the second information data, carrying out a complex subband filtering process combining the subband sample data related to the set of subband samples into a sequence of numeric values associated with the original digital data, and thereby obtaining the original digital data from the sequence of numeric values;

said operating means further producing an operation formula by subdividing an exponent of the exponent operation into an integer part and a fraction part and conducting through a multiplication an operation related to the fraction part according to the operation formula, conducting through a shift operation an operation related to the integer part, thereby attaining the subband sample data;

said operating means calculating the sequence of numeric values on the basis of the subband sample data associated with the set of subband samples;

third storage means for temporarily storing therein the sequence of numeric values calculated by the operating means;

third write means for writing the sequence of numeric values in a predetermined area of the third storage means;

third read means for reading the sequence of numeric values from the third storage means; and output means for outputting therefrom digital data obtained by the operation means; and wherein:

the operating means calculates only a first portion of the sequence of numeric values according to a correlation in a plurality of numeric values included in the sequence of numeric values; and the operating means obtains the original digital data according to, in place of a second portion of the sequence of numeric values, the first portion of the sequence of numeric values having a correlation with the second portion of the sequence of numeric values.

15. A decoder according to claim 14, further comprising read control means for controlling the third read means, wherein:

the third read means reads under control of the read control means, when the first numeric values of the sequence of numeric values calculated by the operating means are beforehand stored in the third storage means, a portion of the sequence of numeric values to which the first numeric values belong from the third storage means; and the third read means reads under control of the read control means, when the first numeric values of the sequence of numeric values are missing in the third storage and a second numeric values having a correlation with the first numeric values are beforehand stored therein, a portion of the sequence of numeric values to which the second numeric values belong from the third storage means.

16. A decoder according to claim 15, further comprising sign changing means for changing a sign of the numeric values according to a predetermined condition, the numeric value being read from the third storage means under control of the read control means.

17. A decoder according to claim 15, wherein the read control means specifies a read address of the third storage means, thereby reading the numeric values having a correlation with the calculated numeric values.

18. A decoder for decoding compression data attained by conducting a compression encoding operation for digital data through a high efficiency encoding in which the data compression is conducted such that one sample is subdivided according to a frequency of a signal represented by the digital data into a set of subband samples representing frequency components of a plurality of subbands and there are extracted from each of the subband samples first information data having a variable bit length and indicating a level of the subband sample logarithmically compressed, second information data representing a factor of the logarithmic compression, third information data denoting the number of the second information items associated with a predetermined data length, and fourth information data representing at least a bit length of the first information data, said decoder comprising:

first storage means for provisionally storing therein at least the second information data and the fourth information data;

first write means for writing at least the second information data and the fourth information data in a predetermined storage area of the first storage means according to the third information data;

first read means for reading at least the second information data and the fourth information data from the predetermined storage area of the first storage means;

second storage means for temporarily storing therein the first information data;

second write means for writing the first information data in the second storage means according to the fourth information data;

second read means for reading the first information data from the second storage means;

operating means for conducting an inverse quantization process obtaining a bit length of each sample data from the first information data according to the fourth information data, executing an inverse scaling process attaining subband sample data indicating a level of the subband sample from each sample data through an exponent operation specified by the second information data, carrying out a complex subband filtering process combining the subband sample data related to the set of subband samples into a sequence of numeric values associated with the original digital data, and thereby obtaining the original digital data from the sequence of numeric values;

said operating means further producing an operation formula by subdividing an exponent of the exponent operation into an integer part and a fraction part and conducting through a multiplication an operation related to the fraction part according to the operation formula, conducting through a shift operation an operation related to the integer part, thereby attaining the subband sample data;

said operating means calculating the sequence of numeric values on the basis of the subband sample data associated with the set of subband samples;

third storage means for temporarily storing therein the sequence of numeric values calculated by the operating means;

third write means for writing the sequence of numeric values in a predetermined area of the third storage means;

third read means for reading the sequence of numeric values from the third storage means; and output means for outputting therefrom digital data obtained by the operation means; and wherein a sequence of processes of attaining the original data from the compression data and outputting the data to an external device are conducted in a pipeline process.

19. A decoder for decoding compression data attained by conducting a compression encoding operation for digital data by using a high efficiency encoding in which the data compression is conducted such that one sample is subdivided according to a frequency of a signal represented by the digital data into a set of subband samples representing frequency components of a plurality of subbands and there are extracted from each of the subband samples first information data having a variable bit length and indicating a level of the subband sample logarithmically compressed, second information data representing a factor of the logarithmic compression, third information data denoting the number of the second information items associated with a predetermined data length, and fourth information data representing at least a bit length of the first information data, said decoder comprising:

first operating means for calculating a sequence of numeric values related to the original data according to the first to fourth information data items;

storage means for storing therein the sequence of numeric values calculated by the first operating means;

write means for writing the sequence of numeric values in a predetermined storage area of the storage means;

read means for reading the sequence of numeric values from the storage means;

read control means for controlling the read means to read, when a numeric value calculated by the first operating means is beforehand stored in the storage means, a portion of the sequence of numeric values to which the value belongs from the storage means;

second operating means for achieving multiplications and additions according to at least the portion of the sequence of numeric values read from the storage means under control of the read control means and a predetermined coefficient and thereby producing digital data items in an item-by-item fashion; and output means for outputting, each time the original digital data is reproduced in the second operation, the digital data to an external device.

20. A decoder according to claim 19, wherein:

the compression data is audio compression data conforming to moving picture experts group (MPEG) standards;

the first information data is sample data;

the second information data is scale factor data;

the third information data is scale factor selection information (scfsi) data;

the fourth information data is allocation data;

the sequence of numeric values are V vectors; and the predetermined coefficient is an inverse quantization coefficient.

21. A decoder according to claim 19, wherein a sequence of processes of attaining the original data from the compression data and outputting the data to an external device are conducted in a pipeline process.

22. A decoder for decoding compression data which is attained by conducting a compression encoding operation for digital data through a high efficiency encoding and which includes sample data having a variable bit length; the decoder comprising:

storage means for storing therein the sample data;

write means for writing the sample data in the storage means in a state in which the write operation is not necessarily aligned with address boundaries of the storage means; and read means for reading the sample data items from the storage means in an item-by-item manner, the sample data being written in the storage means in a state in which the write operation is not necessarily aligned with address boundaries of the storage means; and wherein said compression data is audio compressed data conforming to moving picture experts group (MPEG) standards.

23. A decoder for decoding compression data which is attained by conducting a compression encoding operation for digital data through a high efficiency encoding and which includes sample data having a variable bit length; the decoder comprising:

storage means for storing therein the sample data;

write means for writing the sample data in the storage means in a state in which the write operation is not necessarily aligned with address boundaries of the storage means; and read means for reading the sample data items from the storage means in an item-by-item manner, the sample data being written in the storage means in a state in which the write operation is not necessarily aligned with address boundaries of the storage means; and wherein the read means includes:

sample specifying means for specifying a position of one sample data item to be read from the storage means:

first latch means for sequentially keeping therein data from the storage means at an address associated with the position specified by the sample specifying means;

second latch means for sequentially keeping therein data outputted from the first latch means;

decision means for deciding that the sample data item to be read from the storage means is stored in an area thereof indicated by one address or in an area indicated by two addresses;

first acquiring means for acquiring, when the decision means decides that the sample data item is in an area indicated by one address, the sample data item as the read object from data kept in the second latch means; and second acquiring means for acquiring, when the decision means decides that the sample data item is in an area indicated by two addresses, the sample data item as the read object from data items respectively kept in the first and second latch means.

24. A decoder according to claim 23, wherein:

the first acquiring means shifts the data kept in the second latch means a predetermined number of bits;

the first acquiring means aligning the sample data item as the read object to a first position of one word; and the first acquiring means setting all bits of one word other than those of the shifted sample data item to "0", thereby acquiring only the sample data item.

25. A decoder according to claim 24 wherein the first acquiring means determines the number of bits of the shift according to the sample data item as the read object in the storage specified by the sample specifying means.

26. A decoder according to claim 23, wherein:

the second acquiring means shifts by predetermined numbers of bits the data items respectively kept in the first and second latch means;

the second acquiring means aligning the sample data item as the read object thus kept in the first and second latch means in a separated fashion to a first position of one word; and the second acquiring means setting all bits of one word other than those of the shifted sample data item to "0", thereby acquiring only the sample data item.

27. A decoder according to claim 26, wherein the second acquiring means determines the number of bits of the shift according to the sample data item as the read object in the storage specified by the sample specifying means.

28. A decoder according to claim 23, wherein the read means further includes adder means for adding the sample data acquired by the first or second acquiring means to a predetermined inverse quantization coefficient.

29. A decoder according to claim 28, wherein the process to acquire the sample data by the first and second acquiring means and the addition process by the adder means are conducted in a pipeline process.

30. A decoder for decoding compression data attained by conducting a compression encoding operation for digital data by using a high efficiency encoding, the decoder comprising:

operating means for calculating a portion of a sequence of numeric values related to the original digital data according to the compression data, the portion of the sequence of numeric values having a correlation with another portion of the sequence of numeric values;

storage means for storing therein at least the portion of the sequence of numeric values calculated by the operating means;

write means for writing at least the portion of the sequence of numeric values in a predetermined area of the storage means;

read means for reading at least the portion of the sequence of numeric values from the storage means; and read control means for controlling the read means to read, in response to a use request of a numeric value, the numeric value from the storage means, and controlling the read means to read, when the requested numeric value is missing in the storage, a numeric value having a correlation with the requested numeric value from the storage means.

31. A decoder according to claim 30, wherein:

the compression data is audio compression data conforming to moving picture experts group (MPEG) standards; and the sequence of numeric values are V vectors.

32. A decoder according to claim 30, wherein the read control means specifies a read address of the storage means, thereby controlling the read means to read the numeric value having a correlation with the requested numeric value from the storage means.

33. A decoder according to claim 30, further comprising sign changing means for changing a sign of the numeric value read from the storage means under control of the read control means, the sign being changed according to a predetermined condition.

34. A decoder according to claim 33, wherein:

the compression data is audio compression data conforming to moving picture experts group (MPEG) standards; and the sequence of numeric values are V vectors.

35. A decoder according to claim 33, wherein the sign changing means changes the sign of the numeric value read from the storage means according to a control signal supplied from the read control means.

* * * * *